US012791968B2

(12) United States Patent
Mogi

(10) Patent No.: US 12,791,968 B2
(45) Date of Patent: Nov. 10, 2026

(54) IMAGE FORMING APPARATUS INCLUDING CHARGE REMOVING APPARATUS AND IMAGE FORMING APPARATUS INCLUDING CHARGE APPLICATION APPARATUS

(71) Applicant: CANON KABUSHIKI KAISHA, Tokyo (JP)

(72) Inventor: Keisuke Mogi, Chiba (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 19/245,090

(22) Filed: Jun. 20, 2025

(65) Prior Publication Data

US 2026/0010104 A1 Jan. 8, 2026

(30) Foreign Application Priority Data

Jul. 3, 2024 (JP) ................................ 2024-107797

(51) Int. Cl.
*G03G 15/23* (2006.01)
*G03G 15/00* (2006.01)

(52) U.S. Cl.
CPC ....... *G03G 15/235* (2013.01); *G03G 15/6558* (2013.01); *G03G 15/6573* (2013.01); *G03G 15/6579* (2013.01); *G03G 2215/00654* (2013.01)

(58) Field of Classification Search
CPC ............. G03G 15/235; G03G 15/6558; G03G 15/6573; G03G 15/6579; G03G 2215/00654; G03G 2215/00417; G03G 21/00
See application file for complete search history.

(56) References Cited

U.S. PATENT DOCUMENTS

2016/0187803 A1* 6/2016 Matsudaira ........ G03G 15/6573 399/341
2019/0163095 A1* 5/2019 Onishi ............... G03G 15/6573
2021/0216027 A1* 7/2021 Tanaka ............... G03G 15/6573
2021/0216031 A1 7/2021 Tanaka et al.
2022/0324672 A1* 10/2022 Hamabata .......... G03G 15/6573
2022/0350271 A1 11/2022 Azami

FOREIGN PATENT DOCUMENTS

JP 2019167169 A 10/2019
JP 2021111526 A 8/2021
JP 2022171206 A 11/2022

* cited by examiner

*Primary Examiner* — Sandra Brase
(74) *Attorney, Agent, or Firm* — Canon U.S.A., Inc. IP Division

(57) ABSTRACT

An image forming apparatus includes an image printing unit configured to print an image on a sheet, a charge removing unit that is arranged downstream of a reversing conveyance path in a sheet conveyance direction and configured to remove a charge of a sheet, and a charge removing control unit configured to control voltage to be applied to the charge removing member, wherein the charge removing control unit performs control to apply voltage to the charge removing member with first polarity in a case where a first simplex printing operation is executed, to apply voltage to the charge removing member with second polarity in a case where a second simplex printing operation is executed, and to apply voltage to the charge removing member with the first polarity in a case where a duplex printing operation is executed.

17 Claims, 19 Drawing Sheets

FACE-UP SHEET DISCHARGE

FACE-DOWN SHEET DISCHARGE

IMAGE FORMING APPARATUS INCLUDING CHARGE REMOVING APPARATUS AND IMAGE FORMING APPARATUS INCLUDING CHARGE APPLICATION APPARATUS

BACKGROUND

Field of the Technology

The present disclosure relates to an image forming apparatus including a charge removing apparatus that removes charges of a sheet, and an image forming apparatus including a charge application apparatus that applies charges to a sheet.

Description of the Related Art

In an electrophotographic or electrostatic recording printer, when an image is formed on a sheet, high voltage is applied to a roller. In such a printer, a sheet is sometimes charged depending on the characteristics of the sheet or a condition of environment where a printer is installed.

If sheets are charged during image formation and the sheets stick to each other by electrostatic force generated between the discharged sheets, a stacking failure sometimes occurs. In view of the foregoing, Japanese Patent Application Laid-Open No. 2019-167169 discusses an image forming apparatus including a charge removing apparatus that removes charges of a sheet. The charge removing apparatus discussed in Japanese Patent Application Laid-Open No. 2019-167169 includes a contact charge removing device (charge removing roller) that removes charges by being in contact with a conveyed sheet, and a non-contact charge removing device that removes charges in a non-contact state with respect to the sheet. There has been also known a charge application apparatus that improves a stacking failure by applying voltages to every other sheet of conveyed sheets, and charging the sheets in such a manner that surfaces of the sheets have the same polarity when being stacked (refer to Japanese Patent Application Laid-Open No. 2022-171206).

Japanese Patent Application Laid-Open No. 2019-167169 and Japanese Patent Application Laid-Open No. 2022-171206 have a configuration of applying either voltage of positive polarity or negative polarity.

The polarity of a charged sheet when the sheet is conveyed to a charge removing unit or a charge application unit varies depending on a print setting. In a case where voltage with the same polarity as the polarity of the surface of the charged sheet is applied, the charging of the sheet deteriorates. For this reason, it is necessary to apply voltage with appropriate polarity to a charged sheet.

SUMMARY

In view of the foregoing, some embodiments of the present disclosure are directed to providing an image forming apparatus that executes charge removing or charge adjustment with polarity appropriate for a charged sheet.

According to an aspect of the present disclosure, an image forming apparatus includes an image printing unit configured to print an image on a sheet, a reversing conveyance path configured to reverse a conveyance direction of a conveyed sheet on which an image is printed by the image printing unit, a duplex printing conveyance path configured to convey a sheet conveyed from the reversing conveyance path, again to the image printing unit, a conveyance control unit configured to control conveyance of a sheet, a charge removing unit that is arranged downstream of the reversing conveyance path in a sheet conveyance direction and configured to remove a charge of a sheet by applying voltage to a charge removing member, and a charge removing control unit configured to control voltage to be applied to the charge removing member, wherein, in a case of executing a first simplex printing operation of conveying a sheet to the charge removing unit in a state in which a simplex-printed surface is a top surface, the conveyance control unit controls the sheet to be conveyed to the charge removing unit without passing through the reversing conveyance path and the duplex printing conveyance path, wherein, in a case of executing a second simplex operation of conveying a sheet to the charge removing unit in a state in which a simplex-printed surface is a bottom surface, the conveyance control unit controls the sheet to be conveyed to the charge removing unit by passing through the reversing conveyance path without passing through the duplex printing conveyance path, wherein, in a case of executing a duplex printing operation of conveying a sheet to the charge removing unit in a state in which a second surface of a duplex-printed sheet is a top surface, the conveyance control unit controls a sheet with a first surface on which an image is printed by the image printing unit, to be conveyed again to the image printing unit through the reversing conveyance path and the duplex printing conveyance path, and the sheet with the second surface on which an image is printed by the image printing unit, the second surface being a rear surface of the first surface, to be conveyed to the charge removing unit, and wherein the charge removing control unit performs control to apply voltage to the charge removing member with first polarity in a case where the first simplex printing operation is executed, to apply voltage to the charge removing member with second polarity in a case where the second simplex printing operation is executed, and to apply voltage to the charge removing member with the first polarity in a case where the duplex printing operation is executed.

According to another aspect of the present disclosure, an image forming apparatus includes an image printing unit configured to print an image on a sheet, a reversing conveyance path configured to reverse a conveyance direction of a conveyed sheet on which an image is printed by the image printing unit, a duplex printing conveyance path configured to convey a sheet conveyed from the reversing conveyance path, again to the image printing unit, a conveyance control unit configured to control conveyance of a sheet, a charge application unit that is arranged downstream of the reversing conveyance path in a sheet conveyance direction and is configured to apply charge to a sheet by applying voltage to a charge application member for every other sheet in such a manner that a surface potential of a sheet on which an image is printed by the image printing unit is reversed, and a charge application control unit configured to control voltage to be applied to the charge application member, wherein, in a case of executing a first simplex printing operation of conveying a sheet to the charge application unit in a state in which a simplex-printed surface is a top surface, the conveyance control unit controls the sheet to be conveyed to the charge application unit without passing through the reversing conveyance path and the duplex printing conveyance path, wherein, in a case of executing a second simplex operation of conveying a sheet to the charge application unit in a state in which a simplex-printed surface is a bottom surface, the conveyance control unit controls the sheet to be conveyed to the charge application unit by passing through the reversing conveyance path without passing through the duplex printing conveyance path, wherein, in a case of executing a duplex printing operation of conveying a sheet to the charge application unit in a state in which a second surface of a duplex-printed sheet is a top surface, the conveyance control unit controls a sheet with a first surface on which an image is printed by the image printing unit, to be conveyed again to the image printing unit through the reversing conveyance path and the duplex printing conveyance path, and the sheet with the second surface on which an image is printed by the image printing unit, the second surface being a rear surface of the first surface, to be conveyed to the charge application unit, and wherein the charge application control unit performs control to apply voltage to a charge application member with first polarity in a case where the first simplex printing operation is executed, to apply voltage to the charge application member with second polarity in a case where the second simplex printing operation is executed, and to apply voltage to the charge application member with the first polarity in a case where the duplex printing operation is executed.

According to still another aspect of the present disclosure, an image forming apparatus includes an image printing unit configured to print an image on a sheet, a reversing conveyance path configured to reverse a conveyance direction of a conveyed sheet on which an image is printed by the image printing unit, a duplex printing conveyance path configured to convey a sheet conveyed from the reversing conveyance path, again to the image printing unit, a conveyance control unit configured to control conveyance of a sheet, a charge removing unit that is arranged downstream of the reversing conveyance path in a sheet conveyance direction, includes a first charge removing member and a second charge removing member, and is configured to remove a charge of a sheet on which an image is printed by the image printing unit at a nip portion formed by the first charge removing member and the second charge removing member, and a charge removing control unit configured to control voltage to be applied to the charge removing unit, wherein, in a case of executing a first simplex printing operation of conveying a sheet to the charge removing unit in a state in which a simplex-printed surface is a top surface, the conveyance control unit controls the sheet to be conveyed to the charge removing unit without passing through the reversing conveyance path and the duplex printing conveyance path, wherein, in a case of executing a second simplex operation of conveying a sheet to the charge removing unit in a state in which a simplex-printed surface is a bottom surface, the conveyance control unit controls the sheet to be conveyed to the charge removing unit by passing through the reversing conveyance path without passing through the duplex printing conveyance path, wherein, in a case of executing a duplex printing operation of conveying a sheet to the charge removing unit in a state in which a second surface of a duplex-printed sheet is a top surface, the conveyance control unit controls a sheet with a first surface on which an image is printed by the image printing unit to be conveyed again to the image printing unit through the reversing conveyance path and the duplex printing conveyance path, and the sheet with the second surface on which an image is printed by the image printing unit, the second surface being a rear surface of the first surface, to be conveyed to the charge removing unit, and wherein the charge removing control unit performs control to apply voltage in such a manner that a direction of an electric field formed in the charge removing unit becomes a direction from the second charge removing member to the first charge removing member in a case where the first simplex printing operation is executed, to apply voltage in such a manner that a direction of an electric field formed in the charge removing unit becomes a direction from the first charge removing member to the second charge removing member in a case where the second simplex printing operation is executed, and to apply voltage in such a manner that a direction of an electric field formed in the charge removing unit becomes a direction from the second charge removing member to the first charge removing member in a case where the duplex printing operation is executed.

According to yet another aspect of the present disclosure, a charge removing apparatus connected to an image forming apparatus, the image forming apparatus including an image printing unit configured to print an image on a sheet, a reversing conveyance path configured to reverse a conveyance direction of a conveyed sheet on which an image is printed by the image printing unit, and a duplex printing conveyance path configured to convey a sheet conveyed from the reversing conveyance path, again to the image printing unit, the charge removing apparatus includes a charge removing unit configured to remove a charge of a sheet by applying voltage to a charge removing member, and a charge removing control unit configured to control voltage to be applied to the charge removing member by acquiring sheet discharge surface information of a sheet from the image forming apparatus, wherein the charge removing control unit applies voltage to the charge removing member with first polarity in a case where a first simplex printing operation of conveying a sheet to the charge removing unit in a state in which a simplex-printed surface is a top surface, without the sheet passing through the reversing conveyance path and the duplex printing conveyance path, is executed, wherein the charge removing control unit applies voltage to the charge removing member with second polarity in a case where a second simplex operation of conveying a sheet to the charge removing unit in a state in which a simplex-printed surface is a bottom surface, by the sheet passing through the reversing conveyance path without passing through the duplex printing conveyance path, is executed, and wherein the charge removing control unit applies voltage to the charge removing member with the first polarity in a case where a duplex printing operation of conveying a sheet with a first surface on which an image is printed by the image printing unit, again to the image printing unit through the reversing conveyance path and the duplex printing conveyance path, and conveying a duplex-printed sheet with a second surface on which an image is printed by the image printing unit, the second surface being a rear surface of the first surface, to the charge removing unit in a state in which the second surface of the duplex-printed sheet is a top surface is executed.

Features of various embodiments of the present disclosure will become apparent from the following description of embodiments with reference to the attached drawings. The following description of embodiments are described by way of example.

DESCRIPTION OF THE EMBODIMENTS

Hereinafter, exemplary embodiments of the present disclosure will be described with reference to the drawings. The dimensions, materials, shapes, and relative arrangement of components described in the following exemplary embodiment are not intended to limit the applied scope of the present technique to these unless otherwise specific description is given.

<Configuration of Image Forming System>

Figure 1:
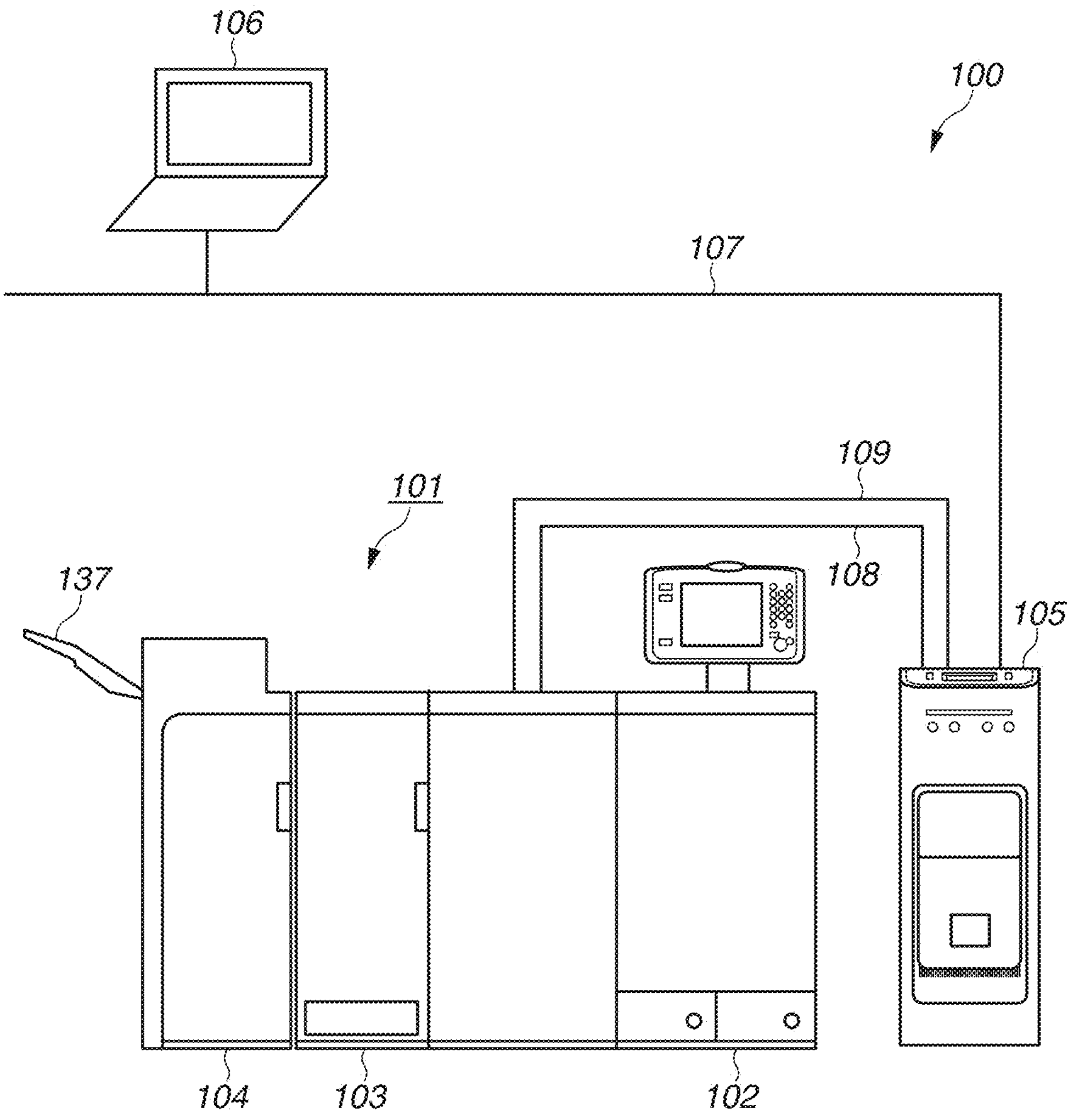
FIG. 1 is an overall view of an image forming apparatus system.

A first exemplary embodiment will be described. FIG. 1 is a configuration diagram of an image forming system 100 including an image forming apparatus according to the present exemplary embodiment. The image forming system 100 includes an image forming apparatus 101 and an external controller 105. The image forming apparatus 101 and the external controller 105 are connected via an internal local area network (LAN) 108 and a video cable 109 in such a manner that communication can be performed. The external controller 105 is connected to a client personal computer (PC) 106 via an external LAN 107. The external controller 105 acquires a print instruction (print job) from the client PC 106.

A printer driver having a function of converting an image into a print description language processable by the external controller 105 is installed on the client PC 106. A user can issue print instructions via the printer driver using various application. The printer driver transmits a print job including image data, to the external controller 105 based on a job from the user. The external controller 105 receives a print job from the client PC 106, performs data analysis and rasterizing processing of image data included in the print job, and issues a print (image formation) instruction to the image forming apparatus 101 based on the image data.

The image forming apparatus 101 includes a printing apparatus 102, a charge removing apparatus 103, and a finisher 104. The printing apparatus 102 forms an image on a sheet based on an instruction from the external controller 105. The charge removing apparatus 103 arranged downstream of the printing apparatus 102 removes charges of a sheet on which an image is formed by the printing apparatus 102. The finisher 104 arranged downstream of the charge removing apparatus 103 stacks a sheet on which an image is formed by the printing apparatus 102, on a discharge tray 137.

The image forming system 100 has a configuration in which the external controller 105 is connected to the image forming apparatus 101, but the external controller 105 is not always required. For example, the image forming apparatus 101 may have a configuration of acquiring a print job including image data directly from the client PC 106 via the external LAN 107. In this case, the image forming apparatus 101 performs data analysis and rasterizing processing performed by the external controller 105. That is, the image forming apparatus 101 and the external controller 105 may be integrally formed.

<System Configuration of Image Forming Apparatus>

Figure 2:
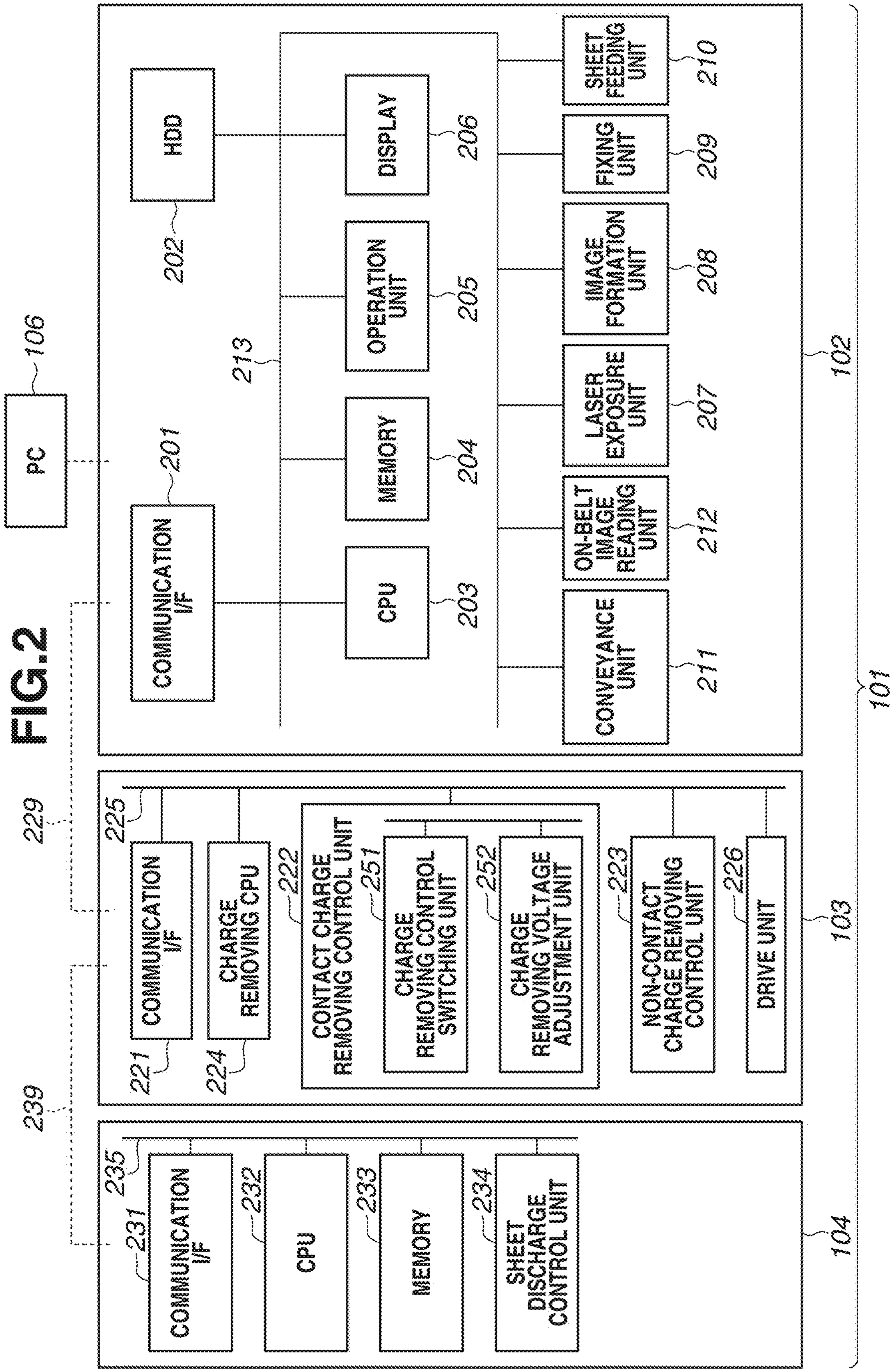
FIG. 2 is a block diagram illustrating a system configuration of an image forming apparatus according to a first exemplary embodiment.

FIG. 2 is a block diagram illustrating a system configuration of the image forming apparatus 101. First of all, a configuration of the printing apparatus 102 of the image forming apparatus 101 will be described. The printing apparatus 102 includes a communication interface (I/F) 201 to communicate with another apparatus. The printing apparatus 102 includes a hard disc drive (HDD) 202, a central processing unit (CPU) 203, a memory 204, and an on-belt image reading unit 212 to control operation of the printing apparatus 102. The printing apparatus 102 includes a laser exposure unit 207, an image formation unit 208, a fixing unit 209, a sheet feeding unit 210, and a conveyance unit 211 to form an image. The printing apparatus 102 includes an operation unit 205 and a display 206 as a user interface. These components are connected to each other via a system bus 213 in such a manner that communication can be performed.

The communication I/F 201 is connected to the charge removing apparatus 103 via a communication cable 229, and controls communication between the printing apparatus 102 and the charge removing apparatus 103. In a case where the image forming apparatus 101 operates by cooperation between the printing apparatus 102 and the charge removing apparatus 103, information and data are transmitted and received via the communication I/F 201.

By executing computer programs stored in the HDD 202, the CPU 203 comprehensively performs image processing and image formation processing (printing control). The memory 204 provides a work area to be used when the CPU 203 executes various types of processing. In a case where image formation processing is performed, the CPU 203 controls the laser exposure unit 207, the image formation unit 208, the fixing unit 209, the sheet feeding unit 210, and the conveyance unit 211.

The laser exposure unit 207 includes a photosensitive member, a charging wire for charging the photosensitive member, and a light source that exposes the photosensitive member to form an electrostatic latent image on the photosensitive member. The photosensitive member is a photosensitive belt in which a photosensitive layer is formed on the surface of a belt-like elastic member, or a photosensitive drum in which a photosensitive layer is formed on the surface of a cylinder, for example. In place of the charging wire, a charging roller may be used. The laser exposure unit 207 charges the surface of the photosensitive member to uniform negative potential using the charging wire. The laser exposure unit 207 outputs laser beams from the light source based on image data. The uniformly-charged surface of the photosensitive member is scanned with laser beams. The potential of the position of the photosensitive member irradiated with laser beams accordingly changes, and an electrostatic latent image is formed on the surface. Four photosensitive members corresponding to four colors of yellow (Y), magenta (M), cyan (C), and black (K) are provided. Electrostatic latent images corresponding to images of different colors are formed on the four photosensitive members.

The image formation unit 208 transfers a toner image formed on a photosensitive member to a sheet. The image formation unit 208 serving as an image printing unit includes a developing device, a transfer unit, and a toner supply unit. The developing device uses toner charged to negative polarity. Four developing devices corresponding to four colors of yellow (Y), magenta (M), cyan (C), and black (K) are provided. The developing device visualizes an electrostatic latent image on a photosensitive member using toner of a corresponding color. If an amount of toner in the developing device becomes insufficient due to the formation of toner images, toner is supplied by the toner supply unit to the developing device.

The transfer unit includes an intermediate transfer belt 118, and transfers a toner image to the intermediate transfer belt 118 from each photosensitive member. A primary transfer roller is provided at a position facing a photosensitive member across the intermediate transfer belt 118. By positive potential being applied to the primary transfer rollers, toner images are transferred to the intermediate transfer belt 118 in a superimposed manner from the four photosensitive members. A full-color toner image is thereby formed on the intermediate transfer belt 118. The full-color toner image formed on the intermediate transfer belt 118 is transferred from the intermediate transfer belt 118 to a sheet P by bias of the same polarity as toner being applied from a secondary transfer inner roller 119*a* in the intermediate transfer belt 118.

The fixing unit 209 fixes the transferred toner image to the sheet. The fixing unit 209 includes a heater and a roller pair. The fixing unit 209 melts and fixes the toner image to the sheet by heating and applying pressure to the toner image on the sheet using the heater and the roller pair. An image is thereby formed on the sheet. The sheet feeding unit 210 includes a conveyance roller and various sensors on a conveyance path, and controls a feeding operation of sheets. The conveyance unit 211 (conveyance control unit) controls sheet conveyance in the image forming apparatus 101. The conveyance unit 211 conveys a sheet fed by the sheet feeding unit 210 to a transfer unit in synchronization with a transfer timing of a toner image, and conveys the sheet bearing the transferred toner image to the fixing unit 209. The sheet to which the toner image is fixed by the fixing unit 209 is conveyed to a conveyance path selected from a conveyance path 125 and a reversing conveyance path 126 in accordance with information of input print data after passing through the fixing unit 209.

Based on an instruction of the CPU 203, the on-belt image reading unit 212 reads an image formed on the intermediate transfer belt 118 of the transfer unit. In a case where the adjustment of an image formation condition is performed, for example, the CPU 203 reads an image for adjustment of an image formation condition that is formed on the intermediate transfer belt 118, using the on-belt image reading unit 212. The operation unit 205 is an input device that receives the entry of various settings and operation instructions from the user. The operation unit 205 includes, for example, various entry keys and a touch panel. The display 206 serving as a display unit is an output device that displays setting information of the image forming apparatus 101 and a processing status of a print job (status information).

Next, a configuration of the charge removing apparatus 103 will be described. The charge removing apparatus 103 includes a communication I/F 221, a contact charge removing control unit 222, and a non-contact charge removing control unit 223. These components are connected via a system bus 225.

The communication I/F 221 is connected to the printing apparatus 102 via a communication cable 229, and controls communication between the printing apparatus 102 and the charge removing apparatus 103. The communication I/F 221 is connected also with the finisher 104 via a communication cable 239, and controls communication between the charge removing apparatus 103 and the finisher 104.

The contact charge removing control unit 222 and the non-contact charge removing control unit 223 perform various types of control based on control instructions issued by the CPU 203 and received via the communication cable 229. The contact charge removing control unit 222 includes a charge removing control switching unit 251 and a charge removing voltage adjustment unit 252, and controls charge removing voltage of a contact charge removing unit 129 to be described below. The charge removing control switching unit 251 acquires the state of a mode lever 141 illustrated in FIG. 3, and switches ON/OFF of the contact charge removing unit 129 based on the state of the mode lever 141. The charge removing voltage adjustment unit 252 acquires a setting value set in a dial 142 to be described below, and controls the magnitude (voltage value, high voltage value) of voltage to be applied to the contact charge removing unit 129, based on the setting value and the polarity of voltage to be applied to a charge removing roller 130*b* that is determined by a charge removing CPU 224. In the present exemplary embodiment, a setting value set in the dial 142 is an absolute value. The non-contact charge removing control unit 223 controls charge removing to be executed by a non-contact charge removing unit 131 to be described below. In the present exemplary embodiment, the charge removing apparatus 103 operates based on a control instruction issued by the CPU 203 included in the image forming apparatus 101, but an operation of the charge removing apparatus 103 is not limited to this, and a control instruction may be issued by a CPU included in the charge removing apparatus 103, for example. A drive unit 226 controls the driving of a motor for conveying sheets that is provided in the charge removing apparatus 103.

Next, a configuration of the finisher 104 will be described. The finisher 104 includes a communication I/F 231, a CPU 232, a memory 233, and a sheet discharge control unit 234. These components are connected via a system bus 235.

The communication I/F 231 is connected with the charge removing apparatus 103 via the communication cable 239, and controls communication between the charge removing apparatus 103 and the finisher 104. In accordance with control programs stored in the memory 233, the CPU 232 performs various types of control necessary for sheet discharge. The memory 233 is a storage device storing control programs. Based on an instruction from the CPU 232, the sheet discharge control unit 234 performs control of conveying a conveyed sheet to the discharge tray 137.

<Configuration of Image Forming Apparatus>

Figure 4:
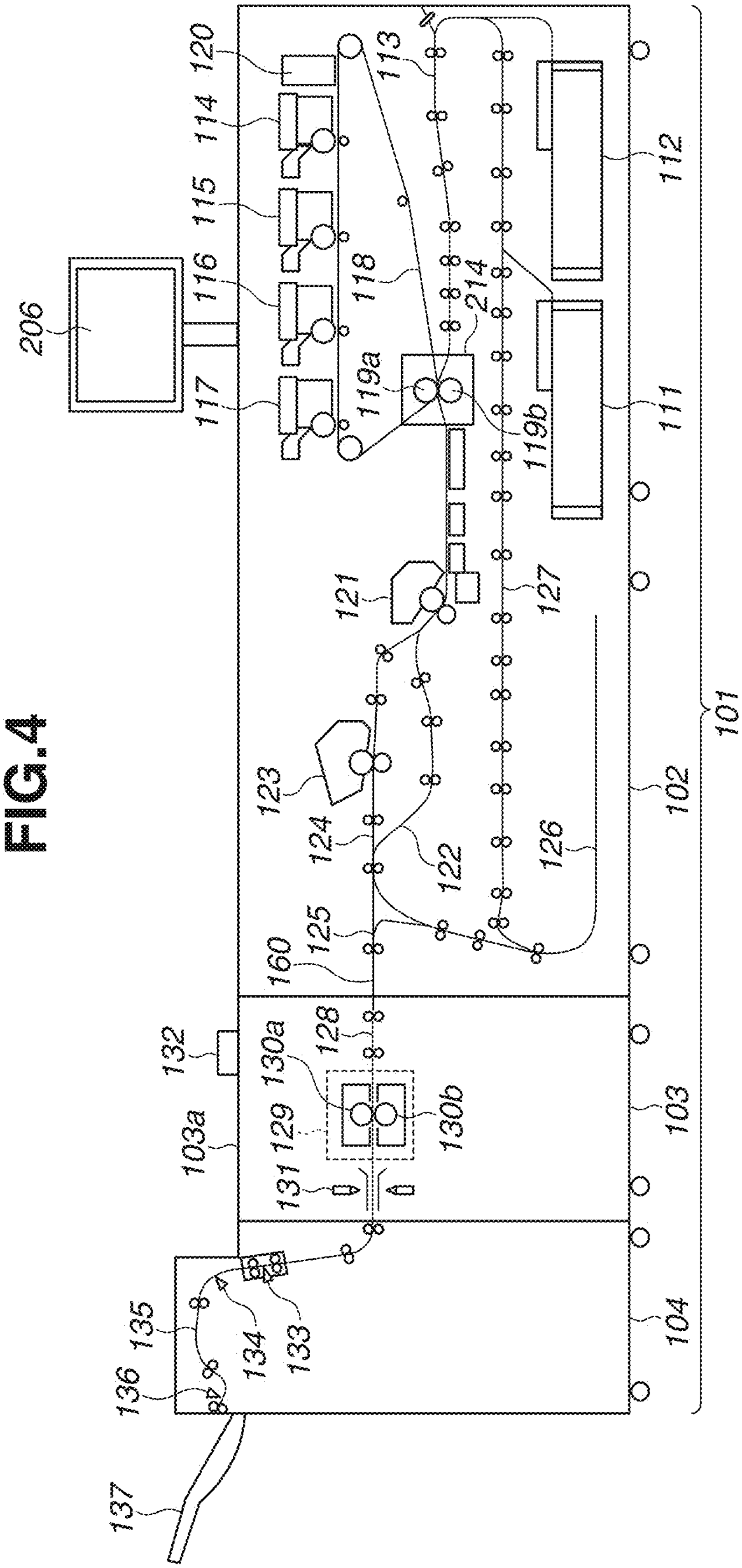
FIG. 4 is a cross-sectional view of an image forming apparatus according to the first exemplary embodiment.

FIG. 4 is a cross-sectional view of the image forming apparatus 101. The display 206 is provided above a casing of the printing apparatus 102. The display 206 displays a printing status of the image forming apparatus 101 and information for settings.

The printing apparatus 102 includes sheet feeding decks 111 and 112, conveyance paths 113, 122, 124, and 125, the reversing conveyance path 126, a duplex printing conveyance path 127, and various rollers. Sheets of different types can be stored in the sheet feeding decks 111 and 112 serving as the sheet feeding unit 210. From the sheets stored in the sheet feeding decks 111 and 112, the uppermost one sheet is separated and fed to the conveyance path 113. The printing apparatus 102 includes, as the laser exposure unit 207, image forming units 114, 115, 116, and 117 for forming images, and forms a color image on a sheet. The image forming unit 114 forms a black (K) image (toner image). The image forming unit 115 forms a cyan (C) image. The image forming unit 116 forms a magenta (M) image. The image forming unit 117 forms a yellow (Y) image.

The printing apparatus 102 includes, as the image formation unit 208, the intermediate transfer belt 118 to which toner images are transferred from the image forming units 114, 115, 116, and 117, and a secondary transfer roller 119.

The intermediate transfer belt 118 rotates clockwise in FIG. 4, and toner images are transferred (primarily transferred) to the intermediate transfer belt 118 in a superimposed manner from the image forming unit 117, the image forming unit 116, the image forming unit 115, and the image forming unit 114 in this order. A full-color toner image is thereby formed on the intermediate transfer belt 118. By rotating, the intermediate transfer belt 118 conveys the toner image to the secondary transfer roller 119. In synchronization with a timing at which the toner image is conveyed to the secondary transfer roller 119, the conveyance unit 211 conveys a sheet into the conveyance path 113, and feeds the sheet to a secondary transfer portion 214. To transfer (secondarily transfer) the toner image on the intermediate transfer belt 118 to a conveyed sheet, high voltage with the same polarity as the polarity of toner is applied to the secondary transfer inner roller 119*a*. The toner on the intermediate transfer belt 118 repels from the intermediate transfer belt 118, and is transferred onto the sheet in a transfer nip. In the present exemplary embodiment, because toner has negative polarity, negative voltage is applied to the secondary transfer inner roller 119*a*. On the other hand, a secondary transfer outer roller 119*b* is electrically grounded. Alternatively, bias of reverse polarity to the polarity of toner may be applied to the secondary transfer outer roller 119*b*, and the secondary transfer inner roller 119*a* may be electrically grounded.

An on-belt image reading sensor 120 serving as the on-belt image reading unit 212 is provided near the intermediate transfer belt 118. The on-belt image reading sensor 120 is positioned on the downstream side of the image forming units 114, 115, 116, and 117 in a rotational direction of the intermediate transfer belt 118. The on-belt image reading sensor 120 reads an image transferred to the intermediate transfer belt 118 from the image forming units 114, 115, 116, and 117. The on-belt image reading sensor 120 is an optical sensor, for example, and reads an image on the intermediate transfer belt 118 by emitting light to the image and receiving reflected light. For example, the on-belt image reading sensor 120 reads an image for adjustment formed on the intermediate transfer belt 118 for adjusting an image formation condition. The CPU 203 analyzes a reading result of the image for adjustment that is obtained by the on-belt image reading sensor 120, and performs calibration by feeding the reading result back to the image formation condition.

The printing apparatus 102 includes a first fixing device 121 and a second fixing device 123 serving as the fixing unit 209. The first fixing device 121 and the second fixing device 123 have the same configuration, and fix a toner image to a sheet. To fix a toner image to a sheet, the first fixing device 121 and the second fixing device 123 each include a pressure roller and a heating roller. The sheet is heated and pressed by being passed through between the pressure roller and the heating roller, and the toner image is melt and fixed on the sheet with pressure. A sheet having passed through the second fixing device 123 is conveyed to the conveyance path 124. The second fixing device 123 is arranged on the downstream side of the first fixing device 121 in a sheet conveyance direction, and is used to add gloss to an image on a sheet that has been subjected to fixing processing in the first fixing device 121, and to ensure fixability. For this reason, the second fixing device 123 is not used in some cases depending on the type of a sheet or the type of a print job. The conveyance path 122 is provided to convey a sheet having been subjected to the fixing processing in the first fixing device 121, without passing through the second fixing device 123.

After the conveyance path 124 and the conveyance path 122 join together, the conveyance path 125 and the reversing conveyance path 126 are provided. In a case where an instruction is issued to execute duplex printing or to stack sheets on the discharge tray 137 with an image formation surface being set to a bottom surface (hereinafter, will be referred to as face-down sheet discharge), a sheet is conveyed to the reversing conveyance path 126. In a case where a duplex printing instruction is issued, the conveyance direction of the sheet conveyed to the reversing conveyance path 126 is reversed on the reversing conveyance path 126, and the sheet is conveyed to the duplex printing conveyance path 127. By the reversing conveyance path 126 and the duplex printing conveyance path 127, the surface (first surface) of the sheet on which an image is formed is reversed. The sheet is conveyed again to the conveyance path 113 by the duplex printing conveyance path 127, and by being passed through the secondary transfer portion 214 again, an image is formed on a second surface. In the case of the face-down sheet discharge, by switching back a sheet drawn to the reversing conveyance path 126, and conveying the sheet to a conveyance path 160, it becomes possible to discharge the sheet with an image formation surface oriented downward. In the case of simplex printing or in a case where images are formed on both sides in duplex printing, the sheet is conveyed to the charge removing apparatus 103 via the conveyance path 125 and the conveyance path 160. In the case of a simplex print job, an image is formed only on the first surface of the sheet, and in the case of a duplex print job, images are formed on both surfaces of the first surface and the second surface of the sheet. Such sheet conveyance control is performed by the conveyance unit 211 (conveyance control unit).

<Description of Secondary Transfer Portion>

Figure 5:
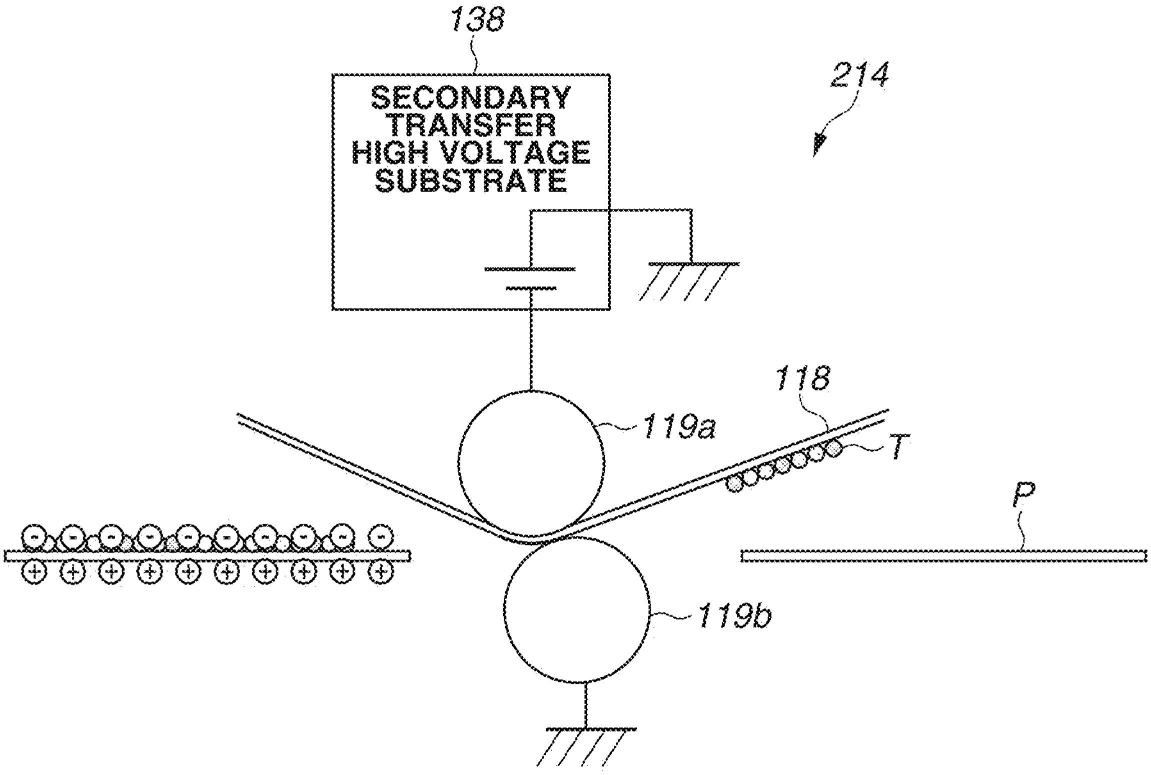
FIG. 5 is a cross-sectional view of a secondary transfer portion.

As described above in <Configuration of Image Forming Apparatus>, in the secondary transfer portion 214, at a transfer nip portion formed by the secondary transfer roller 119 and the intermediate transfer belt 118, a toner image on the intermediate transfer belt 118 is transferred (secondarily transferred) to a sheet. As illustrated in FIG. 5, a configuration in the present exemplary embodiment is a configuration of transferring a toner image by the secondary transfer inner roller 119*a* in the intermediate transfer belt 118 applying high voltage from a secondary transfer high voltage substrate 138. Thus, it is necessary to apply polarity in a direction in which the toner image is detached from the intermediate transfer belt 118, and high voltage with the same polarity as the polarity of toner is applied. In the present exemplary embodiment, because the polarity of toner has a property of being negatively charged, high voltage with negative polarity is applied to the secondary transfer inner roller 119*a*. The top surface of the sheet having passed through the secondary transfer portion 214 is negatively charged, and by dielectric polarization, the bottom surface of the sheet is positively charged.

<Configuration of Charge Removing Apparatus>

Figure 6:
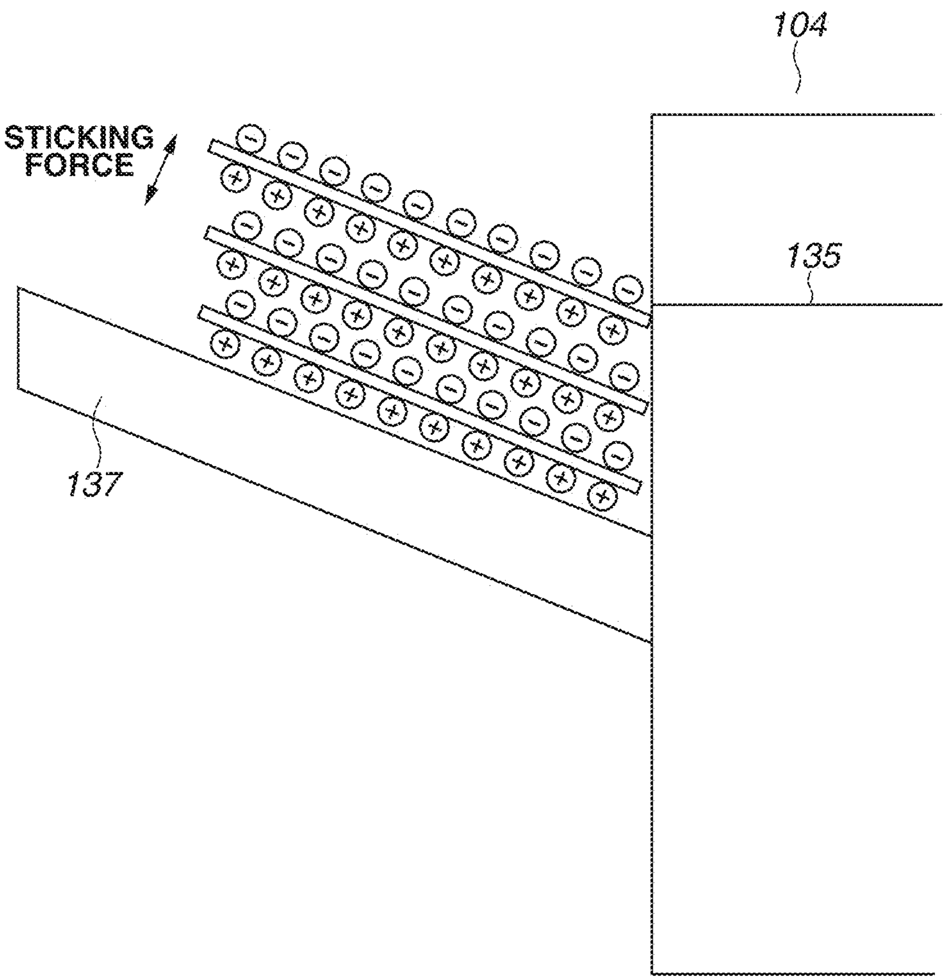
FIG. 6 is a diagram illustrating sheet sticking on a stacking unit.

The charge removing apparatus 103 includes a conveyance path 128, the contact charge removing unit 129, the non-contact charge removing unit 131, and a plurality of conveyance rollers 256. As described above, according to the present exemplary embodiment, after a sheet passes through the secondary transfer portion 214, the top surface of the sheet is negatively charged, and the bottom surface of the sheet is positively charged by dielectric polarization. For this reason, as illustrated in FIG. 6, if sheets are stacked on the discharge tray 137 without the execution of charge removing processing, polarities of contact surfaces of stacked sheets become opposite polarities, and the sheets might stick to each other by electrostatic force. The charge removing apparatus 103 in the present exemplary embodiment removes charges on sheet surfaces by the contact charge removing unit 129 and the non-contact charge removing unit 131 to prevent sheets from sticking to each other by electrostatic force. The non-contact charge removing unit 131 (non-contact charge removing unit) provided downstream of the contact charge removing unit 129 removes charges of a conveyed sheet in a state of not being in contact with the sheet (non-contact state). On a top surface 103*a* that constitutes an apparatus top surface on the exterior of the charge removing apparatus 103, a charge removing operation unit 132 for an operator to turn ON/OFF the contact charge removing unit 129 and making settings related to a voltage value (charge removing voltage) is provided. A sheet conveyed from the printing apparatus 102 to the charge removing apparatus 103 passes through the conveyance path 128, and is subjected to charge removing executed by the contact charge removing unit 129 and the non-contact charge removing unit 131. Then, the sheet having been subjected to charge removing processing is conveyed to the finisher 104.

<Configuration of Finisher>

The finisher 104 stacks sheets delivered from the printing apparatus 102. The finisher 104 includes a conveyance path 135 and the discharge tray 137 on which sheets are to be stacked. On the conveyance path 135, conveyance sensors 133, 134, and 136 are provided. A sheet conveyed from the printing apparatus 102 is discharged to the discharge tray 137 via the conveyance path 135. The conveyance sensors 133, 134, and 136 detect the passage of a sheet conveyed on the conveyance path 135. In a case where a leading edge or a trailing edge in a sheet conveyance direction is not detected by the conveyance sensors 133, 134, and 136 even when a predetermined time elapses since sheet conveyance has started, the CPU 232 determines that a conveyance jam (conveyance abnormality) has occurred in the finisher 104. In this case, the CPU 232 notifies the printing apparatus 102 that a conveyance jam has occurred.

<Configuration of Contact Charge Removing Unit>

Figure 7:
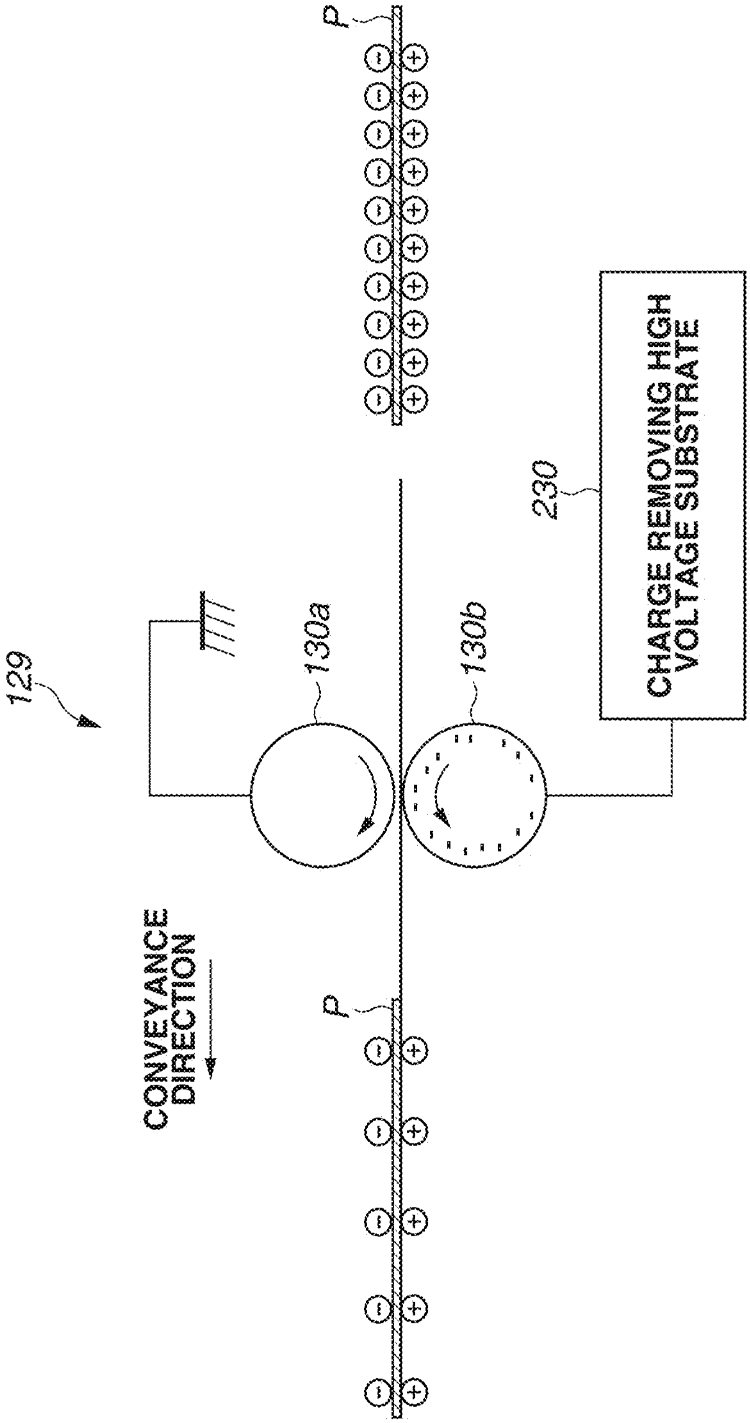
FIG. 7 is a cross-sectional view of a contact charge removing unit.

FIG. 7 is a cross-sectional view illustrating a configuration of the contact charge removing unit 129. The contact charge removing unit 129 includes the charge removing counter roller 130*a* and a charge removing roller 130*b* that serve as a charge removing roller pair that comes into contact with the sheet P. The charge removing roller 130*b* includes an elastic layer of ion conductive foamed rubber and core metal, has an outside diameter of 20 to 25 mm and a resistance value of $1\times10^5$ to $1\times10^8\Omega$ in a case where measurement is conducted by applying a voltage of 2 kV in environmental measurement at 23° C. and 50% RH, and is a member similar to the secondary transfer inner roller 119*a*. The charge removing counter roller 130*a* is made of stainless steel (SUS), and is electrically grounded (connected to the ground). By using a roller with an outside diameter of 20 to 25 mm, and arranging the roller in such a manner as to face the charge removing roller 130*b*, a charge removing nip is formed. The charge removing counter roller 130*a* rotates by receiving driving from a charge removing drive motor (not illustrated), and conveys a sheet nipped by the charge removing nip. Furthermore, a charge removing high voltage substrate 230 is provided in the contact charge removing unit 129. Specifically, the charge removing high voltage substrate 230 applies voltage to the charge removing roller 130*b* serving as a charge removing member. In the present exemplary embodiment, the charge removing high voltage substrate 230 is configured to be able to apply voltages with both polarities of positive polarity and negative polarity in such a manner that their absolute values becomes approximately the same level. In the present exemplary embodiment, the charge removing roller 130*b* is arranged on the bottom surface side of the sheet, but the charge removing roller 130*b* and the charge removing counter roller 130*a* may be in reverse arrangement. In the present exemplary embodiment, the charge removing high voltage substrate 230 can apply voltages with both polarities of positive polarity and negative polarity by one substrate, but two high voltage substrates, one for positive polarity and one for negative polarity may be included. The polarity of voltage to be applied by the charge removing high voltage substrate 230 to the charge removing member is determined in accordance with the polarity of the charge on the surface of the sheet conveyed to the contact charge removing unit 129. In the present exemplary embodiment, a first charge removing roller is the charge removing roller 130*b*, and a second charge removing roller is the charge removing counter roller 130*a*.

The contact charge removing unit 129 according to the present exemplary embodiment has a high charge removing effect because the contact charge removing unit 129 directly applies voltage by being in a contact with the sheet P. On the other hand, the contact charge removing unit 129 has such characteristics that a variation in surface potential of charge-removed sheets P is large, and charge removing tends to become non-uniform. In view of the foregoing, in the charge removing apparatus 103 according to the present exemplary embodiment, the non-contact charge removing unit 131 is provided on the downstream side of the contact charge removing unit 129 in the conveyance direction.

<Configuration of Non-Contact Charge Removing Unit>

Figure 8:
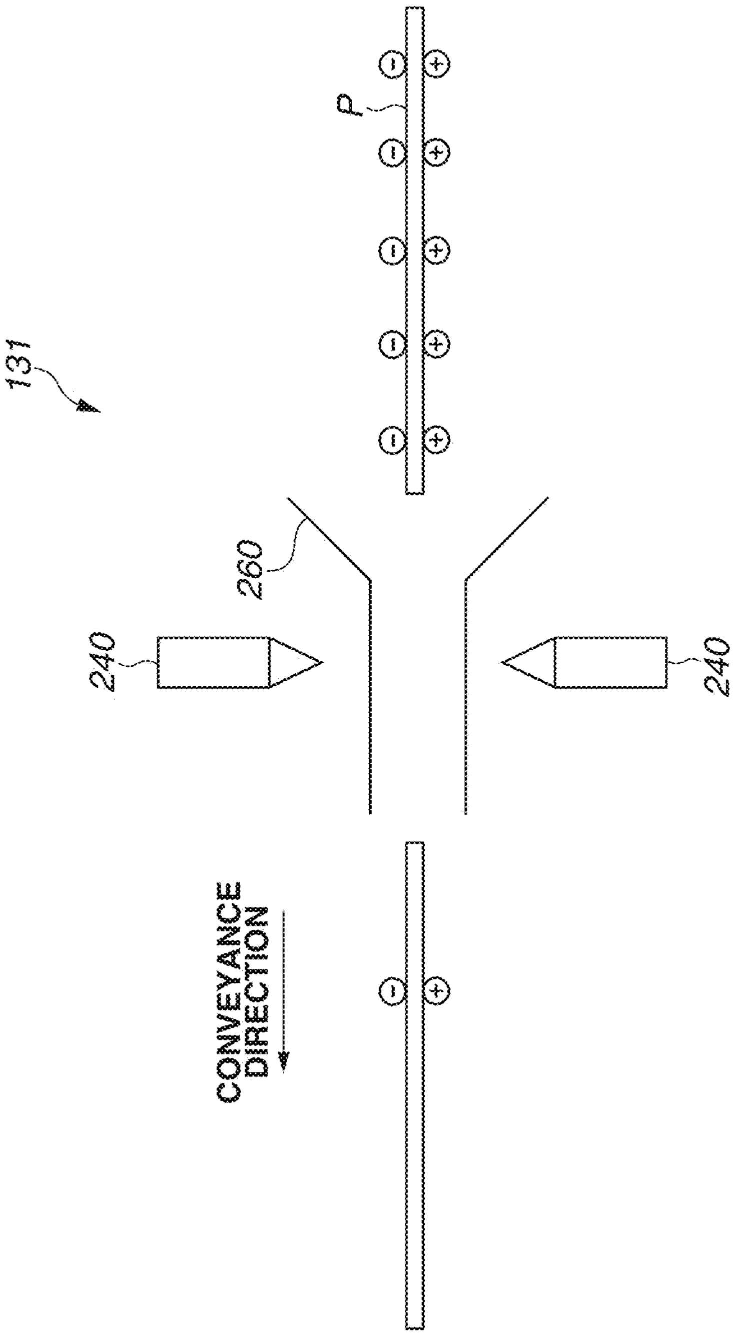
FIG. 8 is a cross-sectional view of a non-contact charge removing unit.
Figure 9:
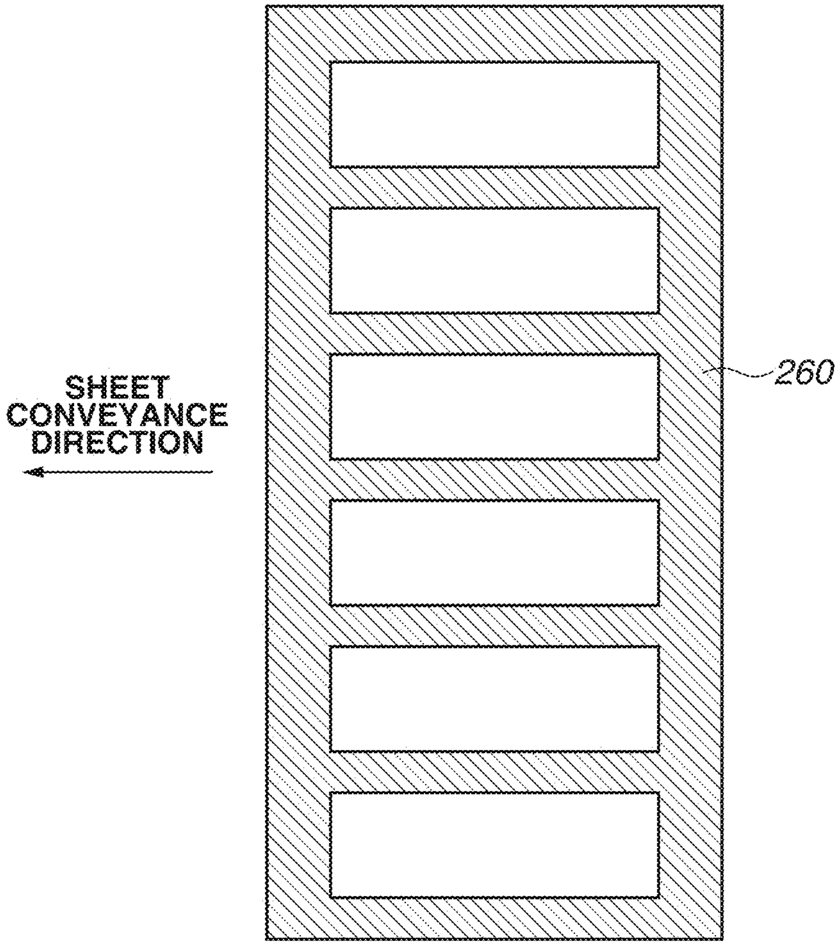
FIG. 9 is a conveyance guide of a non-contact charge removing unit.

FIG. 8 is a cross-sectional view illustrating a configuration of the non-contact charge removing unit 131. FIG. 9 is a plan view of a conveyance guide 260. The non-contact charge removing unit 131 according to the present exemplary embodiment can uniformize the surface potentials of the sheets P that have been made non-uniform by the above-described charge removing processing executed by the contact charge removing unit 129. The non-contact charge removing unit 131 includes an ionizer 240 and the conveyance guide 260. Bar type ionizers IZS40 (SMC Corporation) are arranged above and below the sheet P to form an ionizer irradiation portion. As the conveyance guide 260 arranged at the ionizer irradiation portion, an insulating resin obtained by synthesizing polycarbonate (PC) and acrylonitrile butadiene styrene (ABS) is employed. A volume resistivity of the conveyance guide 260 according to the present exemplary embodiment is $1\times10^{14}$ Ω*cm. Furthermore, as illustrated in FIG. 9, to prevent ions generated from the ion irradiation portion from being physically blocked by a sheet conveyance member, holes are provided in the conveyance guide 260 arranged on the top surface side and the bottom surface side of the sheet. Alternating current (AC) bias is applied to the ionizer 240, and by corona discharge, ions of both of positive polarity and negative polarity are alternately emitted. For this reason, it is possible to remove remaining charges irrespective of the direction of the polarity of the remaining charges in the contact charge removing unit 129. A charge removing effect of the sheet P that is obtained by the non-contact charge removing unit 131 according to the present exemplary embodiment is smaller than the charge removing effect obtained by the contact charge removing unit 129, but a variation in surface potential of the sheets P that is caused after the charge removing processing is small. For this reason, the non-contact charge removing unit 131 can uniformize the surface potentials of the sheets P that have been made non-uniform by the contact charge removing unit 129. In the present exemplary embodiment, an ionizer is employed as the non-contact charge removing unit 131, but the non-contact charge removing unit 131 is not limited to this. For example, an AC Colotron method of applying high voltage to a wire may be used as the non-contact charge removing unit 131.

In the present exemplary embodiment, in the non-contact charge removing unit 131, ionizers are arranged on the top and bottom surface sides of the sheet, but the arrangement is not limited to this. For example, the non-contact charge removing unit 131 may be arranged only on one side of the top side or the bottom side of the sheet. The high voltage to be applied may be direct-current (DC) voltage instead of AC voltage.

<Configuration of Operation Unit of Charge Removing Apparatus>

Figure 3:
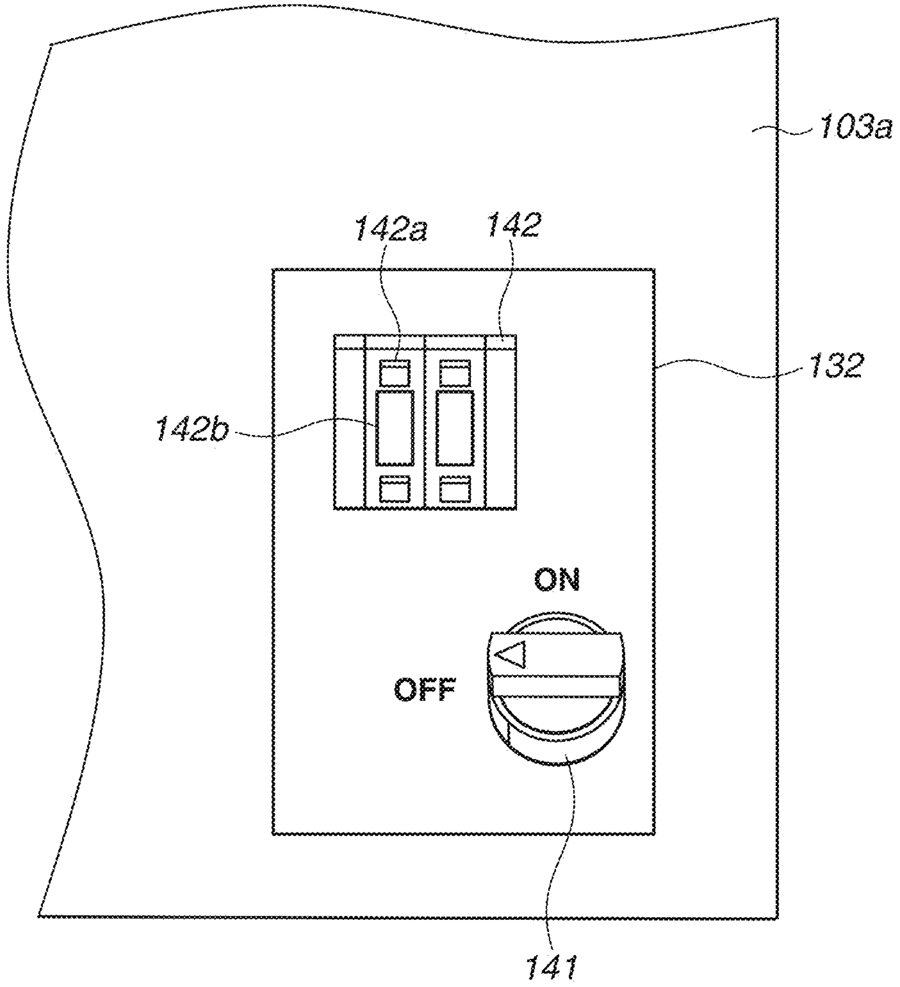
FIG. 3 is a top view of an operation unit of a charge removing apparatus.

As illustrated in FIG. 3, the charge removing apparatus 103 is provided with the charge removing operation unit 132 for setting an operation of the contact charge removing unit 129. The charge removing operation unit 132 is arranged on the top surface 103*a* (apparatus top surface) on the exterior of the charge removing apparatus 103. The charge removing operation unit 132 includes the mode lever 141 and the dial 142. The mode lever 141 is a selector switch for manually switching "ON" and "OFF" (enabled and disabled) of voltage application to the charge removing roller 130*b* by the charge removing high voltage substrate 230. The state of the mode lever 141 is acquired by the charge removing control switching unit 251. The charge removing control switching unit 251 switches ON/OFF of the contact charge removing unit 129 based on the state of the mode lever 141. The non-contact charge removing unit 131 is always in an ON state irrespective of the settings of the mode lever 141 and the dial 142. Even when the mode lever 141 is in an OFF state, a sheet is conveyed. The dial 142 includes a button 142*a* and a display unit 142*b*, and by the button 142*a* being pressed by an operator, a number displayed on the display unit 142*b* switches. A setting value set in the dial 142 is acquired by the charge removing voltage adjustment unit 252. In the present exemplary embodiment, a value obtained by multiplying a value displayed on the dial 142 by 0.1 kV becomes an absolute value of voltage to be applied to the contact charge removing unit 129. Nevertheless, instead of displaying upper two digits of an absolute value of voltage to be applied, an absolute value itself of voltage to be applied may be displayed, or a numerical value indicating the level of voltage to be applied, on a scale of one to ten, for example, may be displayed.

<Setting of Bias Polarity Suitable for Sheet Discharge Surface>

Figure 19:
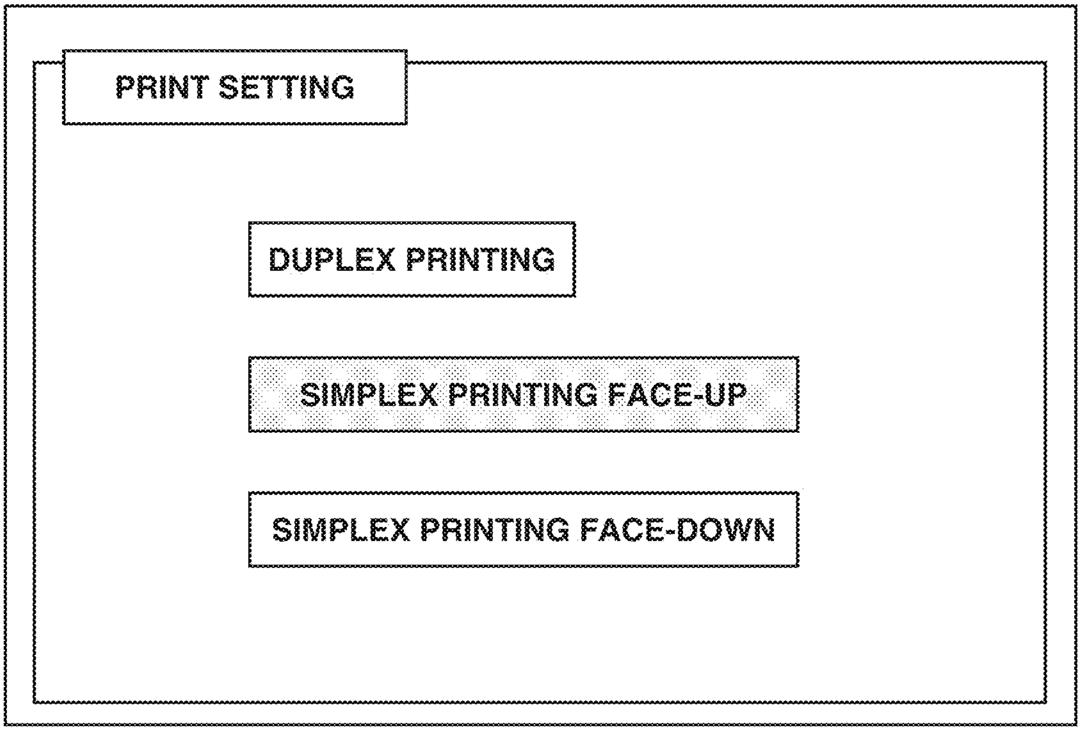
FIG. 19 is a diagram illustrating a sheet discharge setting screen.

As described above, by the secondary transfer portion 214 according to the present exemplary embodiment, the top surface (image formation surface) of the sheet has charges with the negative polarity and the bottom surface (rear surface) of the sheet has charges with the positive polarity. The user selects any of face-up sheet discharge of simplex printing, face-down sheet discharge of simplex printing, and duplex printing sheet discharge as illustrated in FIG. 19 using the client PC 106 or the operation unit 205. The face-up sheet discharge of simplex printing and the face-down sheet discharge of simplex printing refer to discharge methods of sheets in a simplex print job. Based on the designation of printing information that is made by the user, the sheet P is conveyed in such a manner that a selected sheet discharge method is used, and discharged to the discharge tray 137. In the case of face-up sheet discharge of simplex printing, the sheet P is discharged to the discharge tray 137 in such a manner that a simplex-printed image formation surface becomes a top surface. In the case of face-down sheet discharge of simplex printing, the sheet P is discharged to the discharge tray 137 in such a manner that the image formation surface becomes a bottom surface. In the case of duplex printing, the sheet P is discharged to the discharge tray 137 in such a manner that a second surface on the rear side of a first surface becomes a top surface. The first surface of the sheet in a duplex print job refers to a surface on which an image is first formed out of both surfaces of the sheet, and the second surface refers to a surface on which an image is formed secondly out of both surfaces of the sheet. As illustrated in FIG. 4, in a case where the reversing conveyance path 126 is provided on the upstream side of the charge removing apparatus 103 in the conveyance direction, the polarity of charged surface of the sheet conveyed to the charge removing apparatus 103 varies depending on the setting of simplex printing/duplex printing or a front/rear setting of the sheet in sheet discharge. For this reason, the charge removing high voltage substrate 230 of the charge removing apparatus 103 switches polarity to appropriate polarity, and applies voltage to the charge removing roller 130*b*.

Figure 10A:
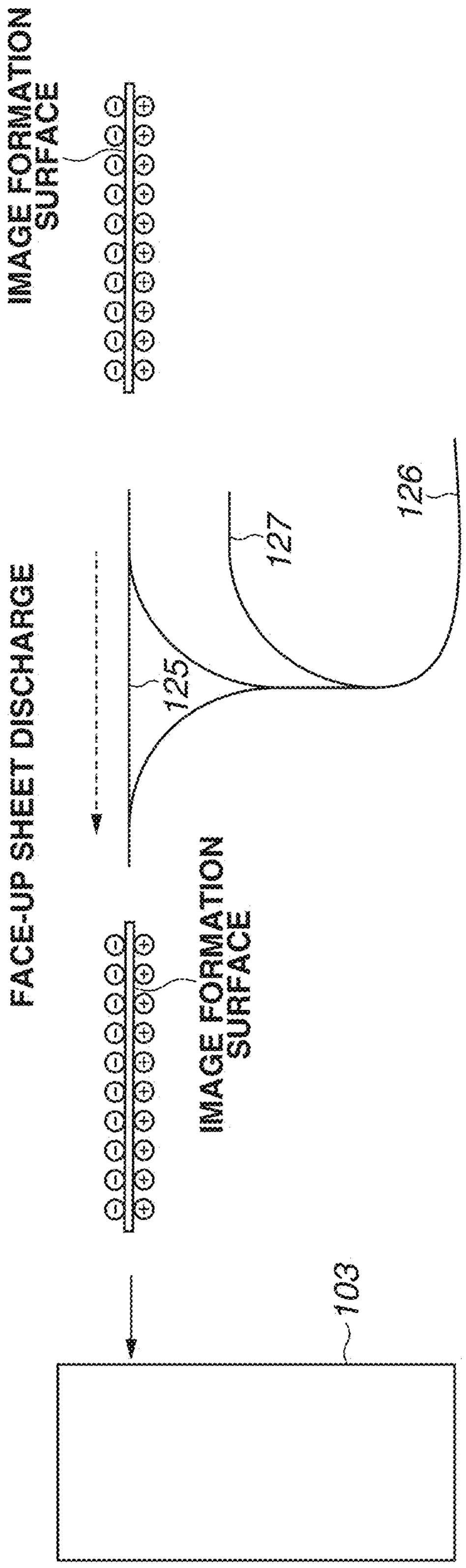
FIG. 10A is a diagram illustrating face-up sheet discharge of simplex printing.
Figure 10B:
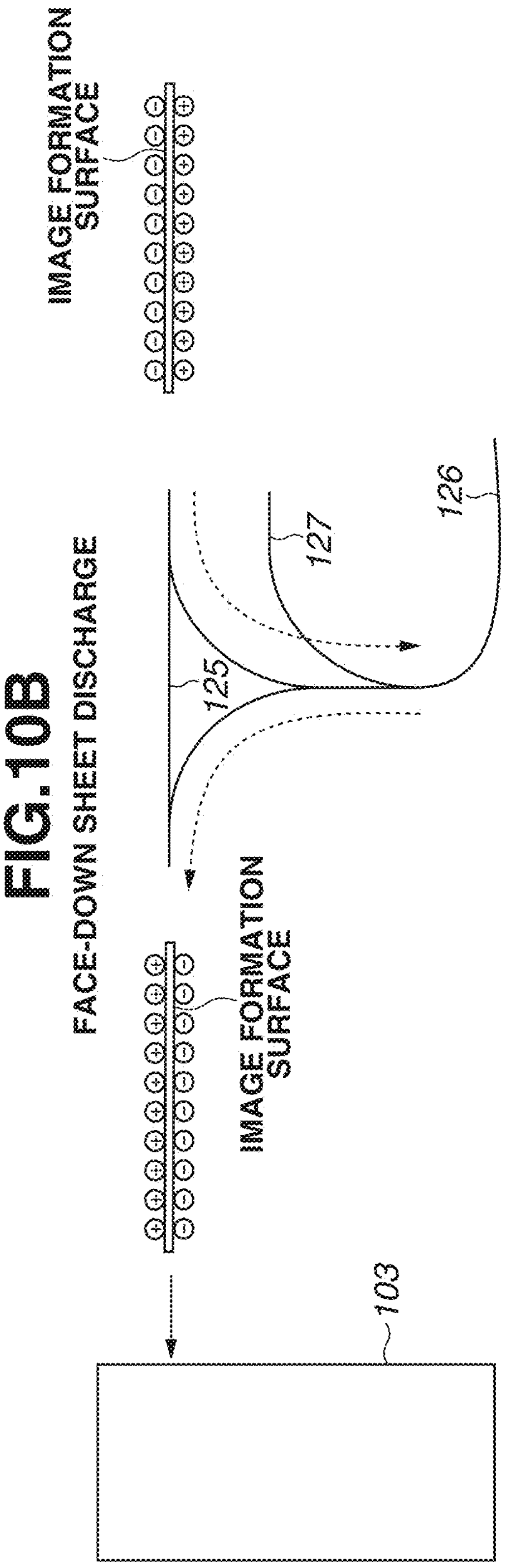
FIG. 10B is a diagram illustrating face-down sheet discharge of simplex printing.

FIG. 10A is a diagram illustrating face-up sheet discharge of simplex printing, and FIG. 10B is a diagram illustrating face-down sheet discharge of simplex printing. As illustrated in FIG. 10, when face-up sheet discharge of simplex printing is designated, because a sheet is not reversed, the sheet is conveyed to the charge removing apparatus 103 with the top surface of the sheet being charged to negative polarity and the bottom surface of the sheet being charged to positive polarity. That is, the sheet is conveyed to the charge removing apparatus 103 while maintaining the polarities of the top and bottom surfaces of the sheet charged in the secondary transfer portion 214. When charges are removed from the sheet in this state, the charge removing roller 130*b* arranged on the bottom surface side of the sheet needs to apply negative charge to the sheet. For this reason, the charge removing high voltage substrate 230 applies negative voltage to the charge removing roller 130*b*.

On the other hand, when face-down sheet discharge of simplex printing is designated, the sheet is conveyed to the charge removing apparatus 103 via the reversing conveyance path 126. At this time, because the front and rear sides of the sheet are reversed by the reversing conveyance path 126, an image formation surface becomes a bottom side and a non-image formation surface becomes a top side. That is, because the front and rear sides of the sheet are reversed, the sheet is conveyed to the charge removing apparatus 103 in a state in which the top surface side of the sheet is positively charged and the bottom surface side of the sheet is negatively charged. For this reason, the charge removing roller 130*b* arranged on the bottom surface side of the sheet needs to apply positive charges to the sheet. For this reason, the charge removing high voltage substrate 230 applies positive voltage to the charge removing roller 130*b*.

Figure 18:
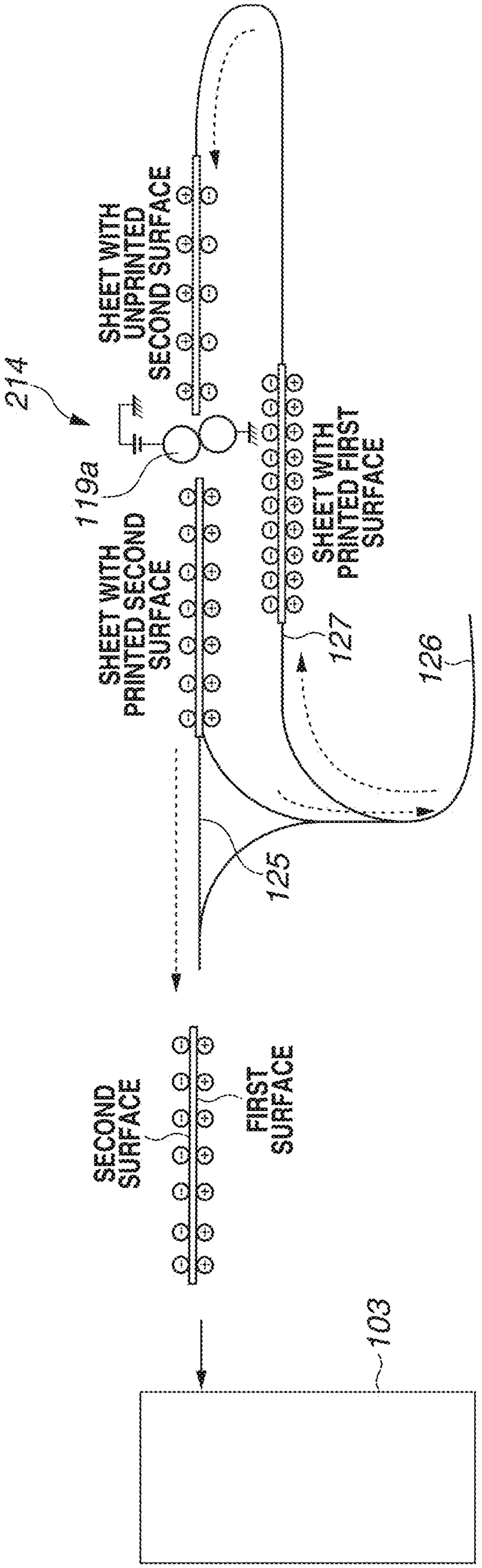
FIG. 18 is a diagram illustrating duplex printing sheet discharge.

FIG. 18 is a diagram illustrating duplex printing sheet discharge. As illustrated in FIG. 18, in the case of duplex printing, first of all, an image is formed on a first surface of a sheet by the secondary transfer portion 214. After that, the conveyance direction of the sheet is reversed on the reversing conveyance path 126, and the sheet is conveyed to the duplex printing conveyance path 127. At this time, because the front and rear sides of the sheet is reversed by the reversing conveyance path 126, when an image is formed on a second surface of the sheet, the sheet is conveyed to the secondary transfer portion 214 in a state in which the top surface of the sheet is positively charged, and the bottom surface of the sheet is negatively charged. At this time, by scraping against a grounded conveyance guide while the sheet is conveyed by the reversing conveyance path 126 and the duplex printing conveyance path 127, a charge amount of the sheet attenuates while the sheet is conveyed. Because a high-resistance sheet has smaller attenuation in a charge amount while the sheet is conveyed via the reversing conveyance path 126 and the duplex printing conveyance path 127, as compared with a low-resistance sheet, the charge of the sheet remains even at the time of transferring to the second surface. The magnitude of transfer current (current flowing from a secondary transfer roller to the sheet S) for obtaining good transfer performance is basically the same between a simplex printing timing, a secondary transfer timing of the first surface in duplex printing, and a secondary transfer timing of the second surface. Part of negative charges supplied to the surface of the sheet from the secondary transfer inner roller 119*a* at a transfer timing of the second surface in duplex printing are consumed by compensating for positive charges on the sheet surface that are generated at a secondary transfer timing of the first surface and remaining up to a transfer timing of the second surface. Consequently, a charge amount of the sheet immediately after secondary transfer to the second surface in duplex printing becomes smaller than a charge amount of the sheet immediately after secondary transfer in simplex printing.

That is, a charge amount obtained when a duplex-printed sheet is conveyed to the charge removing apparatus 103 becomes smaller than a charge amount obtained when a simplex-printed sheet is conveyed to the charge removing apparatus 103. That is, in the case of duplex printing, the sheet is conveyed to the charge removing apparatus 103 in a state in which the top surface of the sheet is negatively charged and the bottom surface of the sheet is positively charged. In this case, the charge removing roller 130*b* arranged on the bottom surface side of the sheet needs to apply a negative charge to the sheet. For this reason, the charge removing high voltage substrate 230 applies negative voltage to the charge removing roller 130*b*. Because a charge amount obtained when a duplex-printed sheet is conveyed to the charge removing apparatus 103 is smaller than a charge amount obtained when a simplex-printed sheet is conveyed to the charge removing apparatus 103, an absolute value of a charge removing voltage in duplex printing has a smaller value than an absolute value of a charge removing voltage value in simplex printing.

In the present exemplary embodiment, the charge removing high voltage substrate 230 can apply voltage by selecting either polarity of the both polarities. For this reason, at the time of face-up sheet discharge of simplex printing and at the time of duplex printing, the charge removing roller 130*b* can apply negative charges to the sheet, and at the time of face-down sheet discharge of simplex printing, the charge removing roller 130*b* can apply positive charges to the sheet. In other words, in the case of face-up sheet discharge of simplex printing and duplex printing, the charge removing CPU 224 determines negative polarity (first polarity) as the polarity of voltage to be applied by the charge removing high voltage substrate 230 to the charge removing roller 130*b*, and in the case of face-down sheet discharge of simplex printing, the charge removing CPU 224 determines positive polarity (second polarity) as the polarity of voltage to be applied by the charge removing high voltage substrate 230 to the charge removing roller 130*b*.

That is, in the case of face-up sheet discharge of simplex printing and duplex printing, it is sufficient that voltage is applied to the charge removing roller 130*b* in such a manner that the direction of an electric field becomes a direction from the charge removing counter roller 130*a* (second charge removing roller) to the charge removing roller 130*b* (first charge removing roller). Furthermore, at the time of face-down sheet discharge of simplex printing, it is sufficient that voltage is applied to the charge removing roller 130*b* in such a manner that the direction of an electric field becomes a direction from the charge removing roller 130*b* (first charge removing roller) to the charge removing counter roller 130*a* (second charge removing roller). At this time, because it is sufficient that voltage is applied in such a manner that the direction of an electric field becomes the above-described direction of the electric field, the charge removing high voltage substrate 230 needs not be able to apply voltages both polarities, and voltage of only either polarity may be applied. For example, negative high voltage power sources may be connected to the charge removing roller 130*b* and the charge removing counter roller 130*a*, and the connection with the negative high voltage power source may be switched depending on a sheet discharge method. Specifically, in a case where the direction of an electric field is set to a direction from the charge removing counter roller 130*a* to the charge removing roller 130*b*, the charge removing roller 130*b* is applied with negative voltage, and in a case where the direction of an electric field is set to a direction from the charge removing roller 130*b* to the charge removing counter roller 130*a*, the charge removing counter roller 130*a* is applied with negative voltage. Nevertheless, in the present exemplary embodiment, whether to remove charges of a sheet passing through the charge removing apparatus 103 is determined based on the above-described state of the mode lever 141, and the magnitude (absolute value) of voltage to be applied when the charges are removed is set using the dial 142. In the present exemplary embodiment, first simplex printing sheet discharge is face-up sheet discharge of simplex printing, and second simplex printing sheet discharge is face-down sheet discharge of simplex printing.

Figure 11:
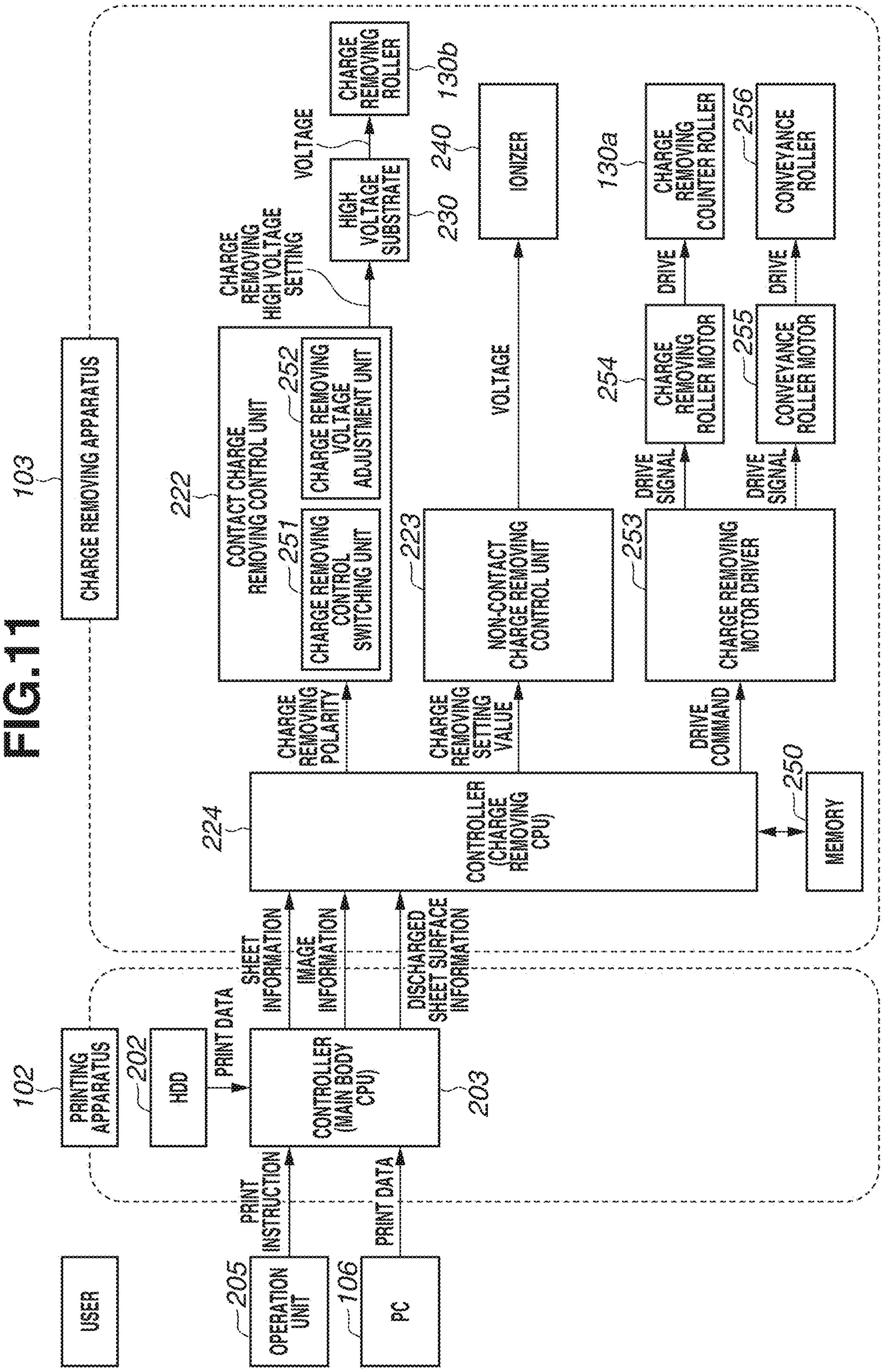
FIG. 11 is an operational block diagram according to the first exemplary embodiment.

FIG. 11 is a block diagram illustrating an operation according to the present exemplary embodiment. Print data is input directly from the PC 106 connected to the outside of the printing apparatus 102, or via the external controller 105 (not illustrated in FIG. 11). As the print data, print data stored in an HDD in the printing apparatus 102 may be designated by the user operating the operation unit 205. The CPU 203 in the printing apparatus 102 that has received the print data determines a necessary image formation condition and a conveyance condition from the print data. At this time, the CPU 203 determines sheet discharge surface information of the sheet from information input from the operation unit 205 or the PC 106. The CPU 203 delivers sheet information, image information, and sheet discharge surface information designated in the print data, to the charge removing CPU 224. Based on the received sheet discharge surface information, the charge removing CPU 224 determines the polarity of voltage to be applied to a charge removing member to remove charges of the sheet. Whether to actually apply charge removing high voltage, and the magnitude of the charge removing high voltage are determined based on the settings of the charge removing control switching unit 251 and the charge removing voltage adjustment unit 252 connected to the contact charge removing control unit 222. Specifically, the charge removing voltage adjustment unit 252 acquires a setting value (absolute value) set in the dial 142, and the polarity determined by the charge removing CPU 224. Then, the charge removing voltage adjustment unit 252 sets the magnitude (voltage value, high voltage value) of voltage that is based on the acquired absolute value and the polarity, in the charge removing high voltage substrate 230. The charge removing high voltage substrate 230 applies voltage to the charge removing roller 130*b* with the set magnitude of voltage. The charge removing CPU 224 also outputs charge removing setting information to the non-contact charge removing control unit 223, and the non-contact charge removing control unit 223 controls voltage to drive the ionizer 240. The charge removing CPU 224 also outputs a drive command to a charge removing motor driver 253, and a driver drives various motors to convey sheets. By the driving of a charge removing roller motor 254, the charge removing counter roller 130*a* rotates, and by the driving of a conveyance roller motor 255, the plurality of conveyance rollers 256 rotates, whereby a sheet is conveyed.

Figure 12:
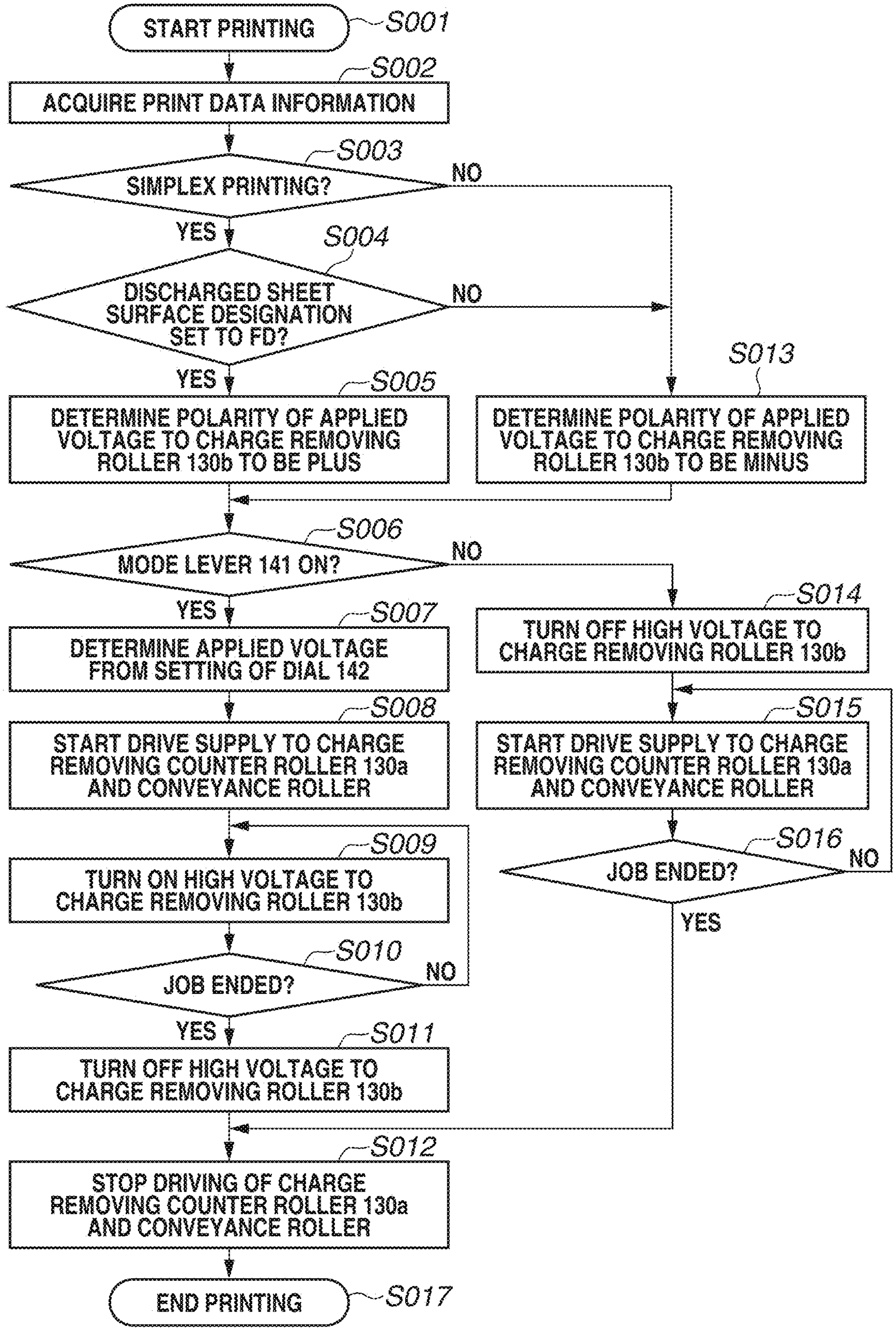
FIG. 12 is a flowchart illustrating an operation.

FIG. 12 is a flowchart illustrating an operation according to the present exemplary embodiment. First of all, in step S001, the user transmits print data, and printing is started. In step S002, print data designated by the user is acquired, and the charge removing CPU 224 obtains designation information of a sheet discharge surface. In step S003, whether printing is simplex printing or duplex printing is checked. In a case where printing is simplex printing (YES in step S003), the processing proceeds to step S004. In step S004, it is determined whether sheet discharge surface designation of simplex printing is face-down sheet discharge. In a case where discharge surface designation is face-down sheet discharge of simplex printing (YES in step S004), the processing proceeds to step S005. In step S005, because the sheet is reversed, the polarity of applied voltage to the charge removing roller 130*b* is determined to be positive polarity. In a case where discharge surface designation is face-up sheet discharge of simplex printing or duplex printing (NO in step S004), the processing proceeds to step S013. In step S013, the polarity of applied voltage is determined to be negative polarity. Next, in step S006, the charge removing CPU 224 checks whether the mode lever 141 is turned ON. If the mode lever 141 is turned ON (YES in step S006), the processing proceeds to step S007. In step S007, the magnitude of a charge removing voltage is determined from the dial 142. If it is determined in step S006 that the mode lever 141 is turned OFF (NO in step S006), the processing proceeds to step S014. In step S014, a charge removing voltage is not applied. If the setting of charge removing is determined, in steps S008 and S015, a motor in the charge removing apparatus 103 is driven and rollers are rotated.

After that, in a case where charge removing is turned ON, in step S009, high voltage is applied to the charge removing roller 130*b*. If it is determined that an input print job is to be ended (YES in step S010 or S016), in a case where charge removing is turned ON, in step S011, high voltage to the charge removing roller 130*b* is turned OFF, in step S012, rollers in the charge removing apparatus 103 are stopped, and in step S017, printing ends.

By executing the above-described configuration, it is possible to execute charge removing with polarity appropriate for a charged sheet.

In the present exemplary embodiment, AC voltage is applied to the non-contact charge removing unit 131, and by corona discharge, ions of both of positive polarity and negative polarity are alternately emitted. For this reason, the non-contact charge removing unit 131 is always in the ON state irrespective of designated sheet discharge is face-up sheet discharge of simplex printing, face-down sheet discharge of simplex printing, or sheet discharge of duplex printing. Nevertheless, the contact charge removing unit 129 needs not always perform the switching of polarity of a charge removing unit depending on a sheet discharge method, and the non-contact charge removing unit 131 may perform the switching. In a case where the non-contact charge removing unit 131 is enabled to switch between positive and negative DC voltages, voltage is desirably applied with polarity suitable for the polarities of the charged top and bottom surfaces of the sheet conveyed to the charge removing apparatus 103. For example, an ionizer arranged on the downside of the sheet may apply negative charge to the sheet at the time of face-up sheet discharge of simplex printing and at the time of duplex printing, and may apply positive charge to the sheet at the time of face-down sheet discharge of simplex printing. In the present exemplary embodiment, the description has been given of a configuration in which ON/OFF of a charge removing high voltage and the magnitude of the charge removing high voltage are manually settable using the mode lever 141 and the dial 142 provided in the charge removing apparatus 103. Nevertheless, exemplary embodiments are not limited to this. The charge removing CPU 224 that has received sheet information and image information from the CPU 203 of the printing apparatus 102 may determine the polarity suitable for a sheet discharge surface while automatically setting the ON/OFF of charge removing and the magnitude of a charge removing high voltage based on a table of a charge removing setting that is stored in a memory 250. The table of the charge removing setting determines a charge removing voltage based on sheet types such as material and thickness, sizes, temperature and humidity of a location where an image forming apparatus 101 is installed, and sensing information in the image forming apparatus 101 and the charge removing apparatus 103. Alternatively, the above-described determination may be performed by the CPU 203 in the image forming apparatus 101 instead of the charge removing CPU 224.

Figure 13:
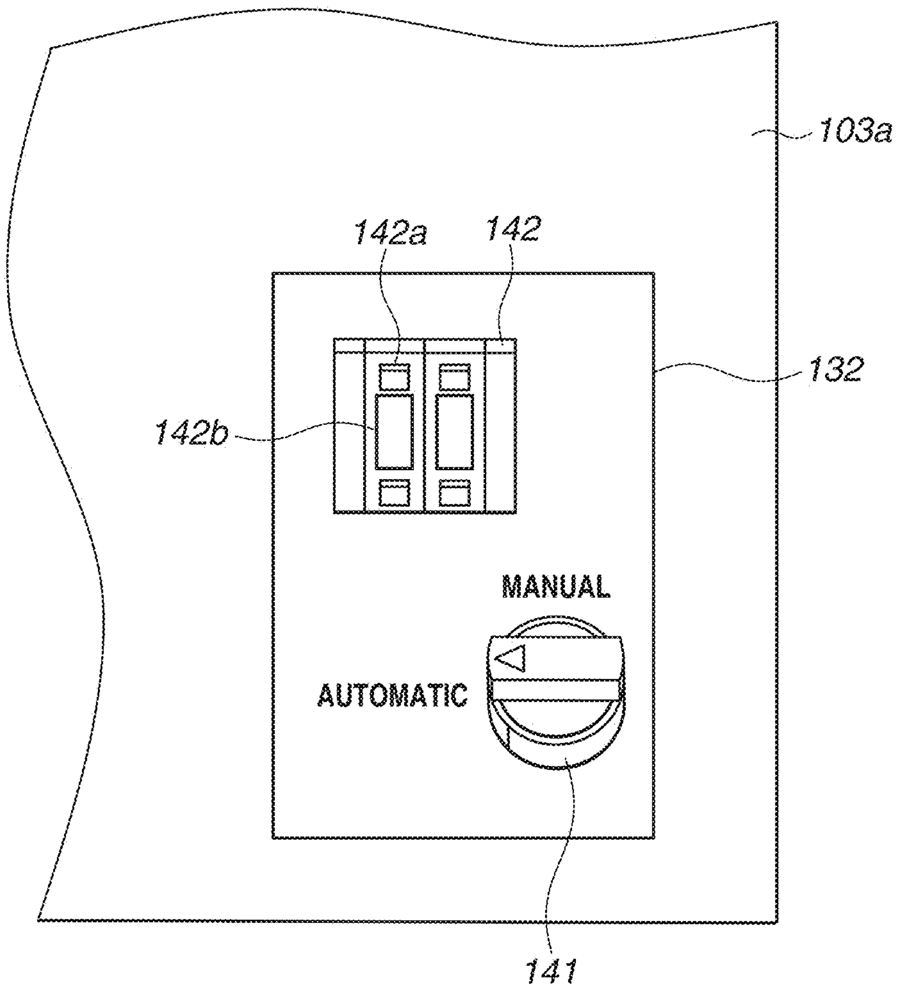
FIG. 13 illustrates an example of a top view of an operation unit of a charge removing apparatus.

As illustrated in FIG. 13, the mode lever 141 may be configured to switch automatic/manual instead of the ON/OFF setting of a charge removing voltage. When "automatic" is selected, as described above, whether to remove charges and a charge removing voltage setting value are automatically determined by the charge removing CPU 224 or the CPU 203 based on sheet information or reversed/unreversed information that is associated with print data, and environmental information of the main body. When "manual" is selected, in a case where a value is input to the dial 142, a charge removing voltage is applied, and the polarity of applied voltage is determined from reversed/unreversed information of print data.

Input from the client PC 106 or the operation unit 205 to the CPU 203 is not limited to sheet discharge surface information such as simplex printing face-up sheet discharge, simplex printing face-down sheet discharge, or duplex printing sheet discharge that is input as print data, and may be another type of job information. In other words, a sheet discharge method may be automatically determined based on job information. For example, when a job of simplex-printing different images on a plurality of sheets is input, the CPU 203 may output face-down sheet discharge to the charge removing CPU 224 as sheet discharge surface information, and when a job of simplex-printing the same image on a plurality of sheets is input, the CPU 203 may output face-up sheet discharge. When a job of simplex-printing different images on a plurality of sheets is input, by associating the job with face-down sheet discharge, printed sheets are sorted in page order. When a job of simplex-printing the same image on a plurality of sheets is input, by associating the job with face-up sheet discharge, because a distance by which a sheet is conveyed becomes shorter than that in face-down sheet discharge, a job times becomes shorter. As another example, an appropriate sheet discharge setting may be associated based on a function setting of an optional unit. For example, in a case where an inner tri-fold function is set in an optional unit, the CPU 203 may output face-up sheet discharge of simplex printing to the charge removing CPU 224. That is, a sheet discharge method needs not always correspond to the direction of an image formation surface of a sheet discharged to the discharge tray 137, and is only required to correspond to the charged states of the top and bottom surfaces of a sheet conveyed to the charge removing apparatus 103.

In a second exemplary embodiment, a charge application apparatus 800 will be described. The charge removing apparatus 103 according to the first exemplary embodiment removes charges of the sheet by applying voltage to the charge removing roller 130*b* in such a manner that the surface potential of the sheet gets closer to about 0. The charge application apparatus 800 according to the second exemplary embodiment applies voltage to a charge application roller 830*b* in such a manner that the polarities of surfaces of sheets are alternately reversed among consecutively-conveyed sheets. A basic configuration of the image forming apparatus is similar to that in the first exemplary embodiment, and only a difference from the first exemplary embodiment will be described. Because the components assigned the same reference numerals as those in the first exemplary embodiment have the same functions, the description will be omitted.

<Configuration of Image Forming System>

Figure 14:
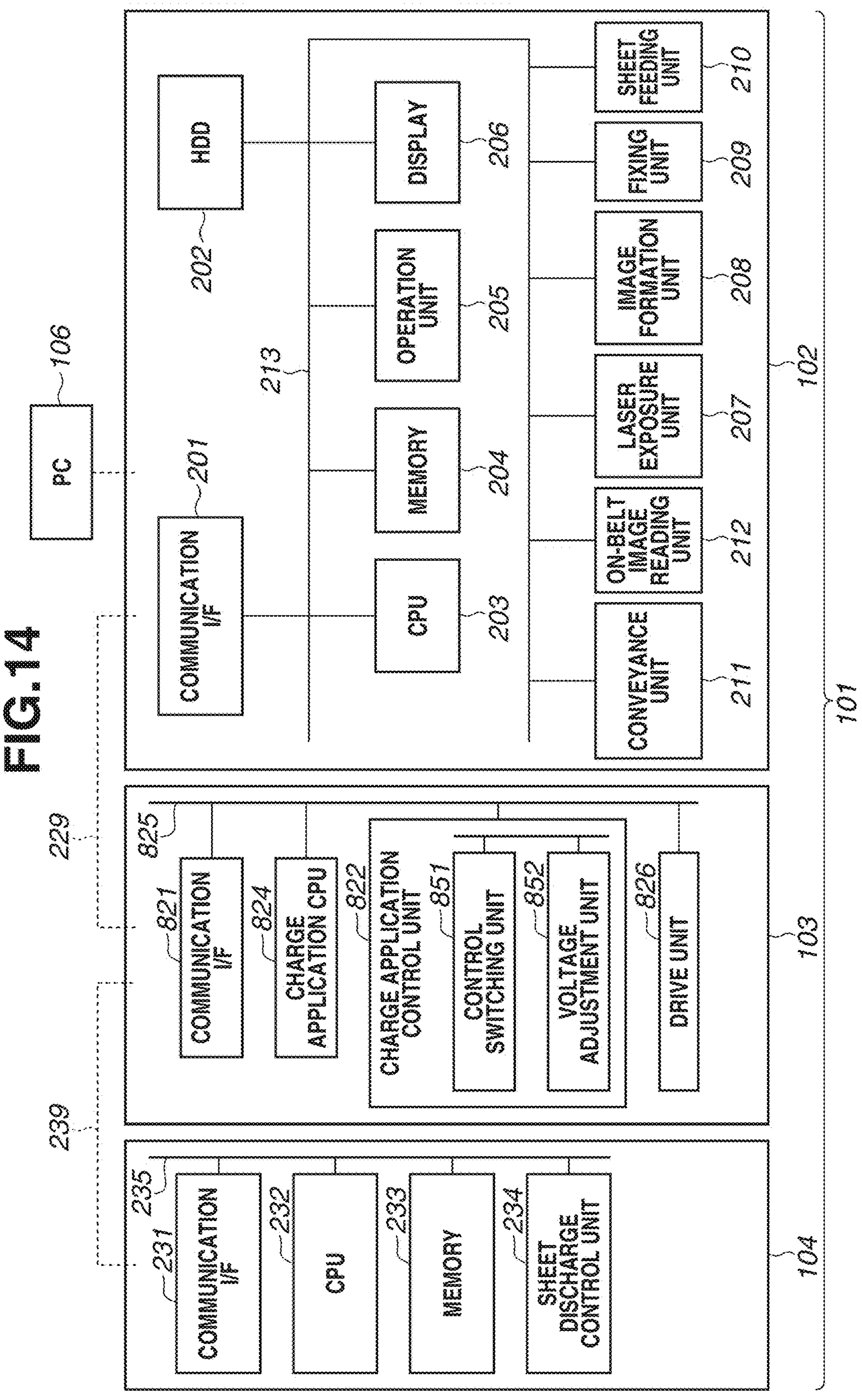
FIG. 14 is a block diagram illustrating a system configuration of an image forming apparatus according to a second exemplary embodiment.
Figure 15:
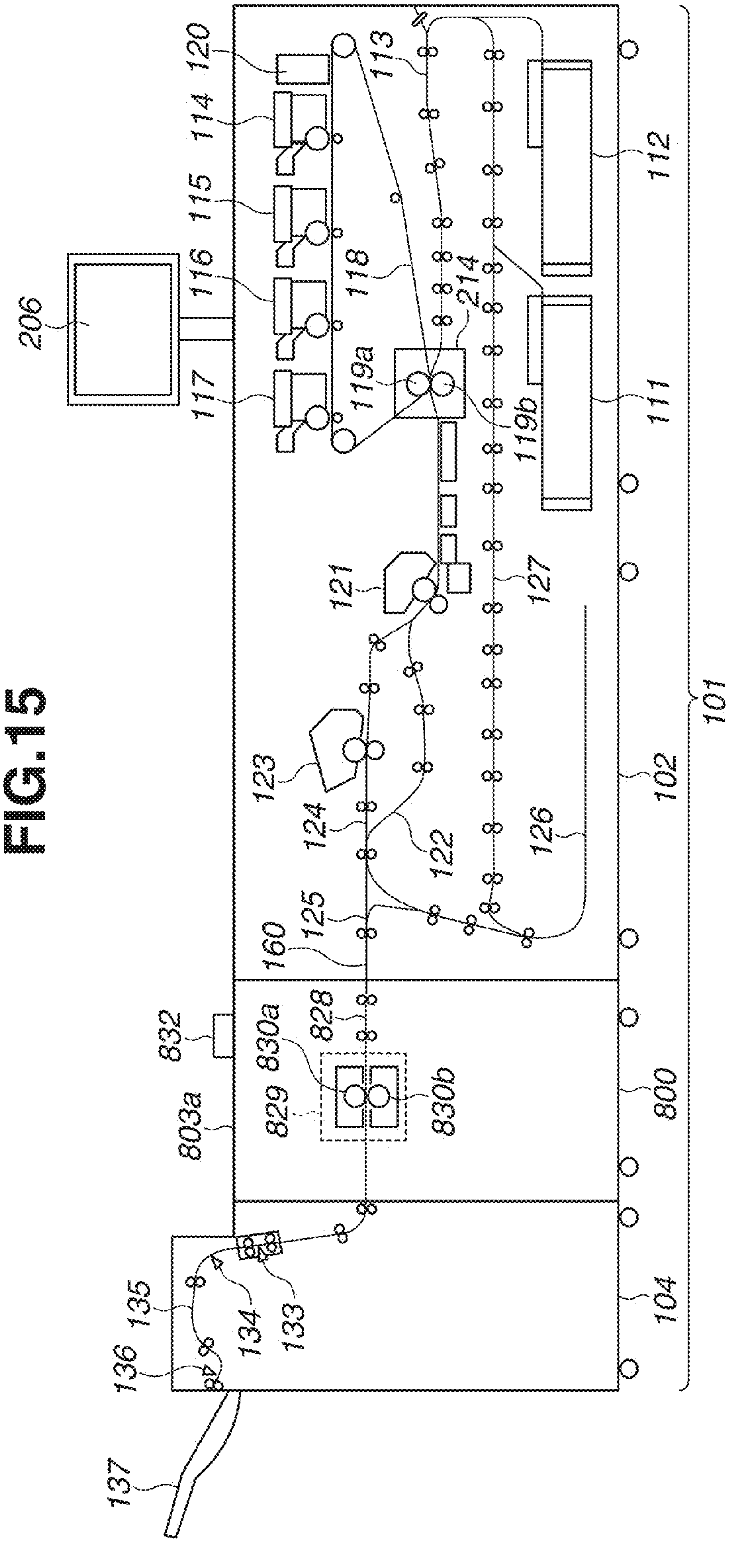
FIG. 15 is a cross-sectional view of an image forming apparatus according to the second exemplary embodiment.

FIG. 14 illustrates a configuration of a system of an image forming apparatus according to the second exemplary embodiment, and FIG. 15 is a cross-sectional view illustrating the image forming apparatus according to the second exemplary embodiment. An image forming apparatus 101 includes a printing apparatus 102, the charge application apparatus 800, and a finisher 104. While the charge removing apparatus 103 according to the first exemplary embodiment includes a non-contact charge removing unit, a charge adjustment apparatus according to the second exemplary embodiment does not include a non-contact charge removing unit.

<Configuration of Charge Application Apparatus>

As illustrated in FIG. 15, the charge application apparatus 800 includes a conveyance path 828, a charge application unit 829, and a plurality of conveyance rollers 856 that receives and conveys sheets from the printing apparatus 102. On a top surface 803*a* constituting an apparatus top surface on the exterior of the charge application apparatus 800, a charge application operation unit 832 is provided. That is, while the charge removing apparatus 103 according to the first exemplary embodiment includes the non-contact charge removing unit 131, the charge application apparatus 800 according to the second exemplary embodiment does not include a non-contact charge removing unit.

FIG. 14 illustrates a configuration of a system of an image forming apparatus according to the second exemplary embodiment. The configuration of the charge application apparatus 800 will be described. The charge application apparatus 800 includes a communication I/F 821, a charge application control unit 822, a charge application CPU 824, and a drive unit 826. These components are connected via a system bus 825. The charge application control unit 822 includes a control switching unit 851 and a voltage adjustment unit 852, and controls voltage to be applied to a roller of the charge application unit 829.

According to the present exemplary embodiment, after a sheet passes through the secondary transfer portion 214 in, the top surface of the sheet is negatively charged, and the bottom surface of the sheet is positively charged by dielectric polarization. For this reason, as illustrated in FIG. 6, if sheets are stacked on the discharge tray 137, polarities of contact surfaces of stacked sheets become opposite polarities, and the sheets might stick to each other by electrostatic force. To prevent sheets from sticking to each other by electrostatic force, the charge application apparatus 800 according to the present exemplary embodiment performs the following control.

Figure 16:
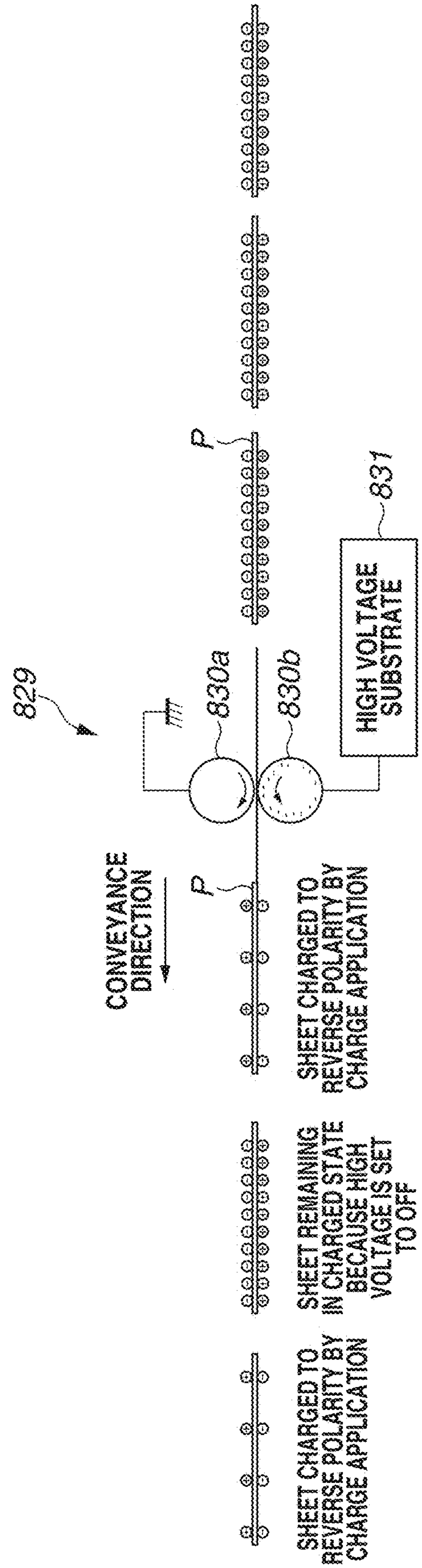
FIG. 16 is a schematic diagram of a charge application unit according to the second exemplary embodiment.

FIG. 16 is a schematic diagram of a charge application unit according to the second exemplary embodiment. The charge application unit 829 includes the charge application roller 830*b* and a charge application counter roller 830*a* that serve as charge application members that come into contact with sheets. The charge application counter roller 830*a* and the charge application roller 830*b* constitute a charge application roller pair serving as the charge application unit 829 that applies charges to the sheet in a state of being in contact with the sheet. The charge application counter roller 830*a* is electrically grounded (connected to the ground). Furthermore, the charge application roller 830*b* is provided with a high voltage substrate 831. Next, the case of face-up sheet discharge will be described. When images are consecutively formed on a plurality of sheets, the charge application control unit 822 performs control in such a manner that the high voltage substrate 831 applies negative voltage to the charge application roller 830*b* for every other sheet, and the sheet is charged with the electrostatic polarity of a sheet surface being reversed. That is, the charge application roller pair applies charges with the reverse polarity of a surface potential of a sheet on which an image is formed. With this configuration, the surface potential of a sheet having passed through the charge application roller pair is reversed from the surface potential of a sheet not having passed through the charge application roller pair. That is, the charge application unit executes charge application processing of applying charges to every other sheet in such a manner that the surface potential of a sheet on which an image is formed is reversed.

For the next sheet following a sheet the polarity of which is reversed, the charge application unit 829 turns high voltage OFF and does not apply charges. For the next sheet further following the sheet, the charge application unit 829 applies charge with the reverse polarity of the sheet again, and the polarity is reversed. In this manner, while turning ON/OFF the charge application to every other sheet, control is performed in such a manner as to reverse polarity when charge application is turned ON.

Figure 17:
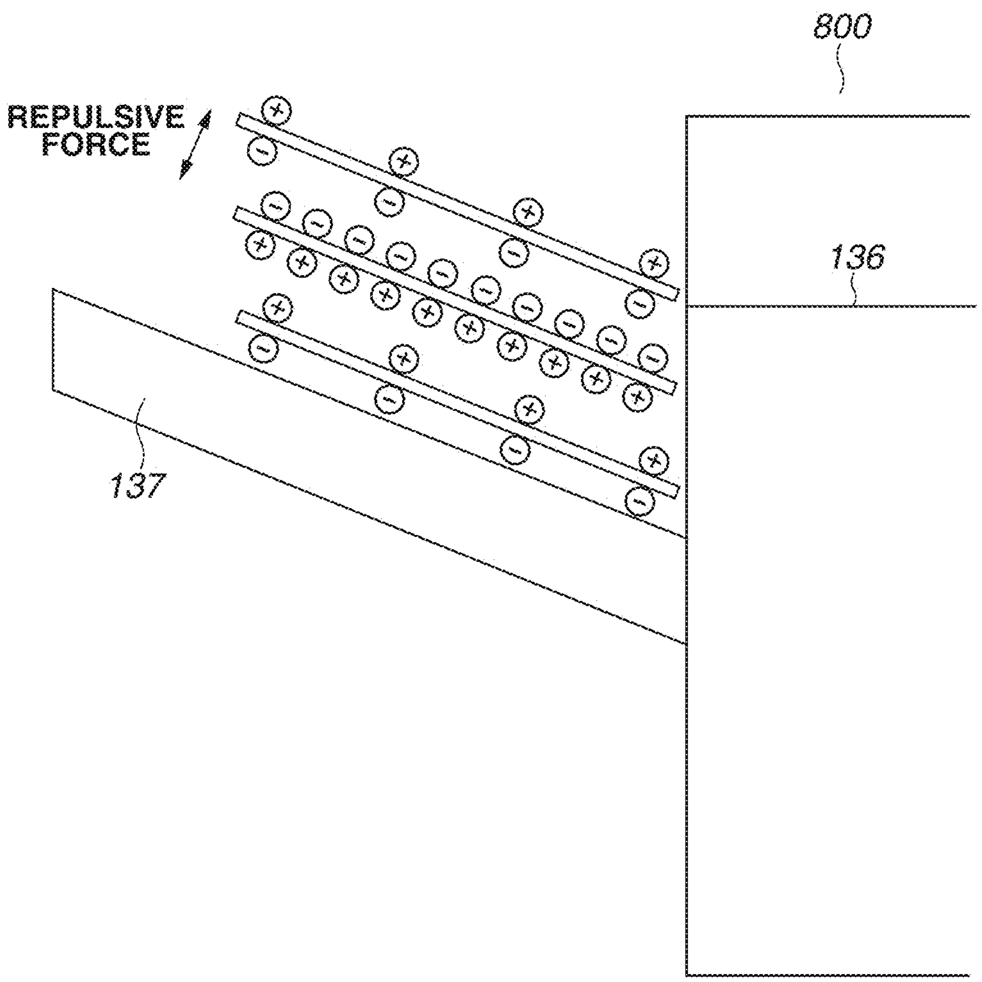
FIG. 17 is an explanatory diagram illustrating sticking prevention on a stacking unit according to the second exemplary embodiment.

If sheets having been subjected to the above-described control are stacked, the sheets are stacked as illustrated in FIG. 17. Because sheet surfaces facing each other when the sheets are stacked have the same polarity and repel each other, repulsive force is generated, and an effect of preventing sheets from sticking to each other is obtained.

Also in the present exemplary embodiment, similarly to the first exemplary embodiment, as illustrated in FIG. 10, in the case of face-down sheet discharge of simplex printing, a sheet is conveyed to the charge application apparatus 800 in a state in which the top surface of the sheet is positively charged and the bottom surface of the sheet is negatively charged. Then, as illustrated in FIGS. 10 and 18, in the case of face-up sheet discharge of simplex printing and duplex printing, a sheet is conveyed to the charge application apparatus 800 in a state in which the top surface of the sheet is negatively charged and the bottom surface of the sheet is positively charged. Also in the charge application apparatus 800, the high voltage substrate 831 can apply either polarity selected from both polarities. Accordingly, at the time of face-up sheet discharge of simplex printing and duplex printing, the charge application roller 830*b* can apply negative charge to the sheet, and at the time of face-down sheet discharge of simplex printing, the charge application roller 830*b* can apply positive charge to the sheet. In other words, in the case of face-up sheet discharge of simplex printing and duplex printing, the charge application CPU 824 determines negative polarity (first polarity) as the polarity of voltage to be applied by the high voltage substrate 831 to the charge application roller 830*b*, and in the case of face-down sheet discharge of simplex printing, the charge application CPU 824 determines positive polarity (second polarity) as the polarity of voltage to be applied by the high voltage substrate 831 to the charge application roller 830*b*. That is, also in the second exemplary embodiment, similarly to the first exemplary embodiment, by the charge application CPU 824 selecting appropriate polarity from print data, it is possible to adjust charge of a sheet with polarity appropriate for the charged sheet similarly to the first exemplary embodiment.

According to an exemplary embodiment of the present disclosure, it is possible to provide an image forming system that executes charge removing or charge application with polarity appropriate for a charged sheet.

Other Embodiments

Embodiment(s) of the present disclosure can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present disclosure has described example embodiments, it is to be understood that some embodiments are not limited to the disclosed embodiments. The scope of the following claims is to be accorded the broadest interpretation so as to encompass all such modifications and equivalent structures and functions.

This application claims priority to Japanese Patent Application No. 2024-107797, which was filed on Jul. 3, 2024 and which is hereby incorporated by reference herein in its entirety.

What is claimed is:

1. An image forming apparatus comprising:

an image printing unit configured to print an image on a sheet;

a reversing conveyance path configured to reverse a conveyance direction of a conveyed sheet on which an image is printed by the image printing unit;

a duplex printing conveyance path configured to convey a sheet conveyed from the reversing conveyance path, again to the image printing unit;

a conveyance control unit configured to control conveyance of a sheet;

a charge removing unit that is arranged downstream of the reversing conveyance path in a sheet conveyance direction and configured to remove a charge of a sheet by applying voltage to a charge removing member; and a charge removing control unit configured to control voltage to be applied to the charge removing member, wherein, in a case of executing a first simplex printing operation of conveying a sheet to the charge removing unit in a state in which a simplex-printed surface is a top surface, the conveyance control unit controls the sheet to be conveyed to the charge removing unit without passing through the reversing conveyance path and the duplex printing conveyance path, wherein, in a case of executing a second simplex printing operation of conveying a sheet to the charge removing unit in a state in which a simplex-printed surface is a bottom surface, the conveyance control unit controls the sheet to be conveyed to the charge removing unit by passing through the reversing conveyance path without passing through the duplex printing conveyance path, wherein, in a case of executing a duplex printing operation of conveying a sheet to the charge removing unit in a state in which a second surface of a duplex-printed sheet is a top surface, the conveyance control unit controls a sheet with a first surface on which an image is printed by the image printing unit, to be conveyed again to the image printing unit through the reversing conveyance path and the duplex printing conveyance path, and the sheet with the second surface on which an image is printed by the image printing unit, the second surface being a rear surface of the first surface, to be conveyed to the charge removing unit, and wherein the charge removing control unit performs control to apply voltage to the charge removing member with first polarity in a case where the first simplex printing operation is executed, to apply voltage to the charge removing member with second polarity in a case where the second simplex printing operation is executed, and to apply voltage to the charge removing member with the first polarity in a case where the duplex printing operation is executed.

2. The image forming apparatus according to claim 1, further comprising an operation unit configured to input information regarding a job, wherein, in a case where a job of simplex-printing a same image on a plurality of sheets is set by the operation unit, the conveyance control unit executes the first simplex printing operation, and wherein, in a case where a job of simplex-printing different images on a plurality of sheets is set by the operation unit, the conveyance control unit executes the second simplex printing operation.

3. The image forming apparatus according to claim 1, wherein the charge removing control unit controls magnitude of voltage to be applied to the charge removing member, and wherein an absolute value of voltage to be applied to the charge removing member in a case where the duplex printing operation is executed is smaller than an absolute value of voltage to be applied to the charge removing member in a case where the first simplex printing operation is executed.

4. The image forming apparatus according to claim 1, wherein the charge removing member is a first charge removing roller, and wherein charge of a sheet is removed in a state of being in contact with the sheet at a nip portion formed by the first charge removing roller and a second charge removing roller.

5. The image forming apparatus according to claim 4, further comprising a non-contact charge removing unit that is arranged downstream of the first charge removing roller in the sheet conveyance direction and is configured to remove a charge of a sheet in a state of being in non-contact with the sheet, wherein the non-contact charge removing unit emits ions with positive polarity and negative polarity irrespective of polarity of voltage to be applied to the first charge removing roller.

6. The image forming apparatus according to claim 1, wherein the image printing unit includes a transfer unit configured to transfer a toner image formed on an intermediate transfer belt, to a sheet.

7. An image forming apparatus comprising:

an image printing unit configured to print an image on a sheet;

a reversing conveyance path configured to reverse a conveyance direction of a conveyed sheet on which an image is printed by the image printing unit;

a duplex printing conveyance path configured to convey a sheet conveyed from the reversing conveyance path, again to the image printing unit;

a conveyance control unit configured to control conveyance of a sheet;

a charge application unit that is arranged downstream of the reversing conveyance path in a sheet conveyance direction and is configured to apply charge to a sheet by applying voltage to a charge application member for every other sheet in such a manner that a surface potential of a sheet on which an image is printed by the image printing unit is reversed; and a charge application control unit configured to control voltage to be applied to the charge application member, wherein, in a case of executing a first simplex printing operation of conveying a sheet to the charge application unit in a state in which a simplex-printed surface is a top surface, the conveyance control unit controls the sheet to be conveyed to the charge application unit without passing through the reversing conveyance path and the duplex printing conveyance path, wherein, in a case of executing a second simplex printing operation of conveying a sheet to the charge application unit in a state in which a simplex-printed surface is a bottom surface, the conveyance control unit controls the sheet to be conveyed to the charge application unit by passing through the reversing conveyance path without passing through the duplex printing conveyance path, wherein, in a case of executing a duplex printing operation of conveying a sheet to the charge application unit in a state in which a second surface of a duplex-printed sheet is a top surface, the conveyance control unit controls a sheet with a first surface on which an image is printed by the image printing unit, to be conveyed again to the image printing unit through the reversing conveyance path and the duplex printing conveyance path, and the sheet with the second surface on which an image is printed by the image printing unit, the second surface being a rear surface of the first surface, to be conveyed to the charge application unit, and wherein the charge application control unit performs control to apply voltage to the charge application member with first polarity in a case where the first simplex printing operation is executed, to apply voltage to the charge application member with second polarity in a case where the second simplex printing operation is executed, and to apply voltage to the charge application member with the first polarity in a case where the duplex printing operation is executed.

8. The image forming apparatus according to claim 7, further comprising an operation unit configured to input information regarding a job, wherein, in a case where a job of simplex-printing a same image on a plurality of sheets is set by the operation unit, the conveyance control unit executes the first simplex printing operation, and wherein, in a case where a job of simplex-printing different images on a plurality of sheets is set by the operation unit, the conveyance control unit executes the second simplex printing operation.

9. The image forming apparatus according to claim 7, wherein the charge application control unit controls magnitude of voltage to be applied to the charge application member, and wherein an absolute value of voltage to be applied to the charge application member in a case where the duplex printing operation is executed is smaller than an absolute value of voltage to be applied to the charge application member in a case where the first simplex printing operation is executed.

10. The image forming apparatus according to claim 7, wherein the charge application member is a first roller, and wherein charge is applied to a sheet in a state of being in contact with the sheet at a nip portion formed by the first roller and a second roller.

11. An image forming apparatus comprising:

an image printing unit configured to print an image on a sheet;

a reversing conveyance path configured to reverse a conveyance direction of a conveyed sheet on which an image is printed by the image printing unit;

a duplex printing conveyance path configured to convey a sheet conveyed from the reversing conveyance path, again to the image printing unit;

a conveyance control unit configured to control conveyance of a sheet;

a charge removing unit that is arranged downstream of the reversing conveyance path in a sheet conveyance direction, includes a first charge removing member and a second charge removing member, and is configured to remove a charge of a sheet on which an image is printed by the image printing unit at a nip portion formed by the first charge removing member and the second charge removing member; and a charge removing control unit configured to control voltage to be applied to the charge removing unit, wherein, in a case of executing a first simplex printing operation of conveying a sheet to the charge removing unit in a state in which a simplex-printed surface is a top surface, the conveyance control unit controls the sheet to be conveyed to the charge removing unit without passing through the reversing conveyance path and the duplex printing conveyance path, wherein, in a case of executing a second simplex printing operation of conveying a sheet to the charge removing unit in a state in which a simplex-printed surface is a bottom surface, the conveyance control unit controls the sheet to be conveyed to the charge removing unit by passing through the reversing conveyance path without passing through the duplex printing conveyance path, wherein, in a case of executing a duplex printing operation of conveying a sheet to the charge removing unit in a state in which a second surface of a duplex-printed sheet is a top surface, the conveyance control unit controls a sheet with a first surface on which an image is printed by the image printing unit to be conveyed again to the image printing unit through the reversing conveyance path and the duplex printing conveyance path, and the sheet with the second surface on which an image is printed by the image printing unit, the second surface being a rear surface of the first surface, to be conveyed to the charge removing unit, and wherein the charge removing control unit performs control to apply voltage in such a manner that a direction of an electric field formed in the charge removing unit becomes a direction from the second charge removing member to the first charge removing member in a case where the first simplex printing operation is executed, to apply voltage in such a manner that a direction of an electric field formed in the charge removing unit becomes a direction from the first charge removing member to the second charge removing member in a case where the second simplex printing operation is executed, and to apply voltage in such a manner that a direction of an electric field formed in the charge removing unit becomes a direction from the second charge removing member to the first charge removing member in a case where the duplex printing operation is executed.

12. The image forming apparatus according to claim 11, further comprising an operation unit configured to input information regarding a job, wherein, in a case where a job of simplex-printing a same image on a plurality of sheets is set by the operation unit, the conveyance control unit executes the first simplex printing operation, and wherein, in a case where a job of simplex-printing different images on a plurality of sheets is set by the operation unit, the conveyance control unit executes the second simplex printing operation.

13. The image forming apparatus according to claim 11, wherein the charge removing control unit controls magnitude of voltage to be applied to the charge removing unit, and wherein an absolute value of voltage to be applied to the charge removing unit in a case where the duplex printing operation is executed is smaller than an absolute value of voltage to be applied to the charge removing unit in a case where the first simplex printing operation is executed.

14. The image forming apparatus according to claim 11, wherein the first charge removing member is a first charge removing roller and the second charge removing member is a second charge removing roller, and wherein charge of a sheet is removed in a state of being in contact with the sheet at a nip portion formed by the first charge removing roller and the second charge removing roller.

15. The image forming apparatus according to claim 14, further comprising a non-contact charge removing unit that is arranged downstream of the first charge removing roller in the sheet conveyance direction, and is configured to remove a charge of a sheet in a state of being in non-contact with the sheet, wherein the non-contact charge removing unit emits ions with positive polarity and negative polarity irrespective of polarity of voltage to be applied to the first charge removing roller.

16. The image forming apparatus according to claim 11, wherein the charge removing control unit performs control to apply voltage to the first charge removing member with first polarity in a case where the first simplex printing operation is executed, to apply voltage to the second charge removing member with the first polarity in a case where the second simplex printing operation is executed, and to apply voltage to the first charge removing member with the first polarity in a case where the duplex printing operation is executed.

17. A charge removing apparatus connected to an image forming apparatus, the image forming apparatus including an image printing unit configured to print an image on a sheet, a reversing conveyance path configured to reverse a conveyance direction of a conveyed sheet on which an image is printed by the image printing unit, and a duplex printing conveyance path configured to convey a sheet conveyed from the reversing conveyance path, again to the image printing unit, the charge removing apparatus comprising:

a charge removing unit configured to remove a charge of a sheet by applying voltage to a charge removing member; and a charge removing control unit configured to control voltage to be applied to the charge removing member by acquiring sheet discharge surface information of a sheet from the image forming apparatus, wherein the charge removing control unit applies voltage to the charge removing member with first polarity in a case where a first simplex printing operation of conveying a sheet to the charge removing unit in a state in which a simplex-printed surface is a top surface, without the sheet passing through the reversing conveyance path and the duplex printing conveyance path, is executed, wherein the charge removing control unit applies voltage to the charge removing member with second polarity in a case where a second simplex printing operation of conveying a sheet to the charge removing unit in a state in which a simplex-printed surface is a bottom surface, by the sheet passing through the reversing conveyance path without passing through the duplex printing conveyance path, is executed, and wherein the charge removing control unit applies voltage to the charge removing member with the first polarity in a case where a duplex printing operation of conveying a sheet with a first surface on which an image is printed by the image printing unit, again to the image printing unit through the reversing conveyance path and the duplex printing conveyance path, and conveying a duplex-printed sheet with a second surface on which an image is printed by the image printing unit, the second surface being a rear surface of the first surface, to the charge removing unit in a state in which the second surface of the duplex-printed sheet is a top surface is executed.

* * * * *